(12) United States Patent
Zhang et al.

(10) Patent No.: US 11,335,127 B2
(45) Date of Patent: May 17, 2022

(54) MEDIA PROCESSING METHOD, RELATED APPARATUS, AND STORAGE MEDIUM

(71) Applicant: TENCENT TECHNOLOGY (SHENZHEN) COMPANY LTD, Shenzhen (CN)

(72) Inventors: Kaihao Zhang, Shenzhen (CN); Wenhan Luo, Shenzhen (CN); Lin Ma, Shenzhen (CN); Wei Liu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 134 days.

(21) Appl. No.: 16/903,929

(22) Filed: Jun. 17, 2020

(65) Prior Publication Data
US 2020/0320284 A1 Oct. 8, 2020

Related U.S. Application Data

(63) Continuation of application No. PCT/CN2019/079156, filed on Mar. 22, 2019.

(30) Foreign Application Priority Data

Apr. 12, 2018 (CN) .......................... 201810327638.4

(51) Int. Cl.
*G06V 40/20* (2022.01)
*G06K 9/62* (2022.01)
*G06N 3/08* (2006.01)

(52) U.S. Cl.
CPC ............ *G06V 40/25* (2022.01); *G06K 9/629* (2013.01); *G06K 9/6215* (2013.01); *G06K 9/6256* (2013.01); *G06N 3/08* (2013.01)

(58) Field of Classification Search
CPC .............. G06K 9/00348; G06K 9/4628; G06T 2207/20081; G06T 2207/20084; G06T 7/246
See application file for complete search history.

(56) References Cited

U.S. PATENT DOCUMENTS

| 9,633,268 | B1 * | 4/2017 | Ma ..................... G06K 9/00342 |
| 2015/0205997 | A1 * | 7/2015 | Ma ..................... G06K 9/00261 382/118 |
| 2017/0243058 | A1 | 8/2017 | Tan et al. |

FOREIGN PATENT DOCUMENTS

| CN | 105574510 A | 5/2016 |
| CN | 106503687 A | 3/2017 |
| (Continued) | | |

OTHER PUBLICATIONS

International Search Report for PCT/CN2019/079156 dated Jun. 20, 2019 (PCT/ISA/210).
(Continued)

*Primary Examiner* — Ross Varndell
(74) *Attorney, Agent, or Firm* — Sughrue Mion, PLLC

(57) ABSTRACT

Provided is a video processing method, including: obtaining a to-be-processed video and generating a first gait energy diagram, the to-be-processed video including an object with a to-be-recognized identity; obtaining a second gait energy diagram, the second gait energy diagram being generated based on a video including an object with a known identity; inputting the first gait energy diagram and the second gait energy diagram into a deep neural network; extracting respective identity information of the first gait energy diagram and the second gait energy diagram, and determining a fused gait feature vector from gait feature vectors of the first gait energy diagram and the second gait energy diagram; and calculating a similarity based on at least the fused gait feature vector. The identity information of the first gait (Continued)

energy diagram includes gait feature vectors, and the identity information of the second gait energy diagram includes gait feature vectors.

18 Claims, 11 Drawing Sheets

(56) References Cited

FOREIGN PATENT DOCUMENTS

| | | | |
|---|---|---|---|
| CN | 104299012 B | * | 6/2017 |
| CN | 106951753 A | | 7/2017 |
| CN | 107085716 A | | 8/2017 |

OTHER PUBLICATIONS

Written Opinion of the International Searching Authority dated Jun. 20, 2019 in International Application English No. PCT/CN2019/079156.

Extended European Search Report dated Nov. 26, 2021, issued by the European Patent Office in application No. 19784939.1.

* cited by examiner

MEDIA PROCESSING METHOD, RELATED APPARATUS, AND STORAGE MEDIUM

CROSS-REFERENCE TO THE RELATED APPLICATION(S)

This application is a bypass continuation application of International Application No. PCT/CN2019/079156, filed Mar. 22, 2019, which claims priority to Chinese Patent Application No. 201810327638.4, entitled "VIDEO PROCESSING METHOD, RELATED APPARATUS, AND STORAGE MEDIUM" and filed with the China National Intellectual Property Administration on Apr. 12, 2018, the disclosures of which are herein incorporated by reference in their entireties.

FIELD

Example embodiments of the disclosure relate to the field of gait recognition technologies, and specifically, to a video processing method, a video processing apparatus, a video processing device, and a storage medium, as well as an image processing method, an image processing apparatus, an image processing device, and a storage medium.

BACKGROUND

There are demands for gait recognition in many fields. For example, outdoor cameras are widely used in public places, but the outdoor cameras are normally located relatively distant from people, and pedestrian recognition may not be properly be performed based on faces included in a captured image or video. In gait recognition technologies, pedestrian recognition may be performed according to gait feature vectors of people, recognition does not need to be performed based on faces, and there is also no need for high-definition image quality. Therefore, the gait recognition technologies have become an important topic for research.

SUMMARY

Example embodiments of the disclosure provide a media processing method, a media processing device, and a storage medium, to implement gait recognition. Further, the example embodiments of the disclosure provide an image processing method, an image processing device, and a storage medium, to implement posture recognition.

According to an aspect of an example embodiment, provided is a media processing method is provided, performed by a media processing device, the method including:
obtaining a to-be-processed video, the to-be-processed video including an object with a to-be-recognized identity;
generating a first gait energy diagram based on the to-be-processed video;
obtaining a second gait energy diagram, the second gait energy diagram being generated based on a video including an object with a known identity;
by using a deep neural network, extracting identity information of the first gait energy diagram and the second gait energy diagram, and determining a fused gait feature vector based on gait feature vectors of the first gait energy diagram, included in the identity information of the first gait energy diagram, and gait feature vectors of the second gait energy diagram, included in the identity information of the second gait energy diagram; and calculating a similarity between the first gait energy diagram and the second gait energy diagram based on at least the fused gait feature vector.

According to an aspect of an example embodiment, provided is a media processing device, including: at least one memory configured to store program code; and at least one processor configured to read the program code and operate as instructed by the program code, the program code including: first obtaining code configured to cause at least one of the at least one processor to obtain a to-be-processed video, the to-be-processed video including an object with a to-be-recognized identity; generating code configured to cause at least one of the at least one processor to generate a first gait energy diagram based on the to-be-processed video; second obtaining code configured to cause at least one of the at least one processor to obtain a second gait energy diagram, the second gait energy diagram being generated based on a video including an object with a known identity; extracting code configured to cause at least one of the at least one processor to, by using a deep neural network, identity information of the first gait energy diagram and the second gait energy diagram, and determine a fused gait feature vector based on gait feature vectors of the first gait energy diagram, included in the identity information of the first gait energy diagram, and gait feature vectors of the second gait energy diagram, included in the identity information of the second gait energy diagram; and calculating code configured to cause at least one of the at least one processor to calculate a similarity between the first gait energy diagram and the second gait energy diagram based on at least the fused gait feature vector.

According to an aspect of an example embodiment, provided is a non-transitory computer-readable storage medium, storing a plurality of instructions executable by at least one processor to perform media processing method, the method comprising: obtaining a to-be-processed video, the to-be-processed video comprising an object with a to-be-recognized identity; generating a first gait energy diagram based on the to-be-processed video; obtaining a second gait energy diagram, the second gait energy diagram being generated based on a video comprising an object with a known identity; by using a deep neural network, extracting identity information of the first gait energy diagram and the second gait energy diagram, and determining a fused gait feature vector based on gait feature vectors of the first gait energy diagram, included in the identity information of the first gait energy diagram, and gait feature vectors of the second gait energy diagram, included in the identity information of the second gait energy diagram; and calculating a similarity between the first gait energy diagram and the second gait energy diagram based on at least the fused gait feature vector.

The deep neural network used in an example embodiment not only extracts the fused gait feature vector of the object with a to-be-recognized identity and the object with a known identity, but also extracts the identity information (including identifiers (IDs) and gait feature vectors) of the object with a to-be-recognized identity and the object with a known identity. In addition, the fused gait feature vector depends on the gait feature vectors. Subsequently, the similarity (that is, a similarity between the object with a to-be-recognized identity and the object with a known identity) between the two gait energy diagrams is calculated based on at least the fused gait feature vector, thereby implementing gait recognition on the object with a to-be-recognized identity.

The deep neural network used in the example embodiments not only extracts a fused posture feature vector of an object with a to-be-recognized identity and an object with a known identity, but also extracts identity information (including IDs and posture feature vectors) of the object with a to-be-recognized identity and the object with a known identity. In addition, the fused posture feature vector depends on the posture feature vectors. Subsequently, a similarity (that is, a similarity between the object with a to-be-recognized identity and the object with a known identity) between two posture energy diagrams is calculated based on at least the fused posture feature vector, thereby implementing posture recognition on the object with a to-be-recognized identity.

BRIEF DESCRIPTION OF THE DRAWINGS

The above and other aspects, features, and advantages of certain example embodiments of the disclosure will be more apparent from the following description taken in conjunction with the accompanying drawings.

DETAILED DESCRIPTION

Figure 1A:
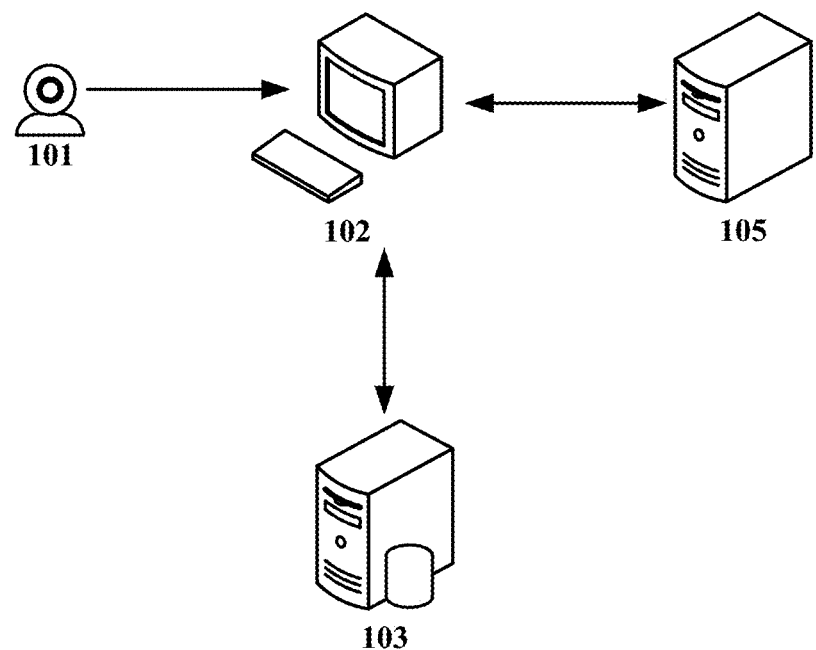
FIG. 1a to FIG. 1d are example structural diagrams of a video processing application scenario according to an example embodiments.

Gait recognition is an emerging biometric feature recognition technology, and aims to perform identity recognition according to people's walking postures. Gait recognition has advantages including being capable of recognizing a user's identity without requiring a contact with the user, even from a long distance, and a difficulty of disguising walking, and does not require high-definition image quality. Therefore, gait recognition is widely applied in various scenarios such as security protection, public security, and public transportation, and has tremendous application potential.

Example embodiments of the disclosure provide a media processing method and related apparatuses (e.g., a media processing device, a storage medium, and the like). The media processing method and the related apparatuses are applicable to various scenarios (for example, intelligent video surveillance) in which a real-time or offline gait recognition technology service is provided.

A representative application scenario of the gait recognition according to the disclosure is described: gait recognition may be used for data retrieval; media (for example, when the media is a video, the media may be referred to as a first video or a to-be-processed video, and video frames in the first video include an object with a to-be-recognized identity) of a to-be-queried-for person (or the object with a to-be-recognized identity) is provided; and a database is queried for a video (which may be referred to as a second video) of a specific person whose identity information is known (an object with a known identity) that is similar or most similar to the object included in the media.

The media processing method and the related apparatuses provided in the example embodiments of the disclosure implement gait recognition based on a deep neural network. For ease of description, in the following example embodiments, a video is mainly used as an optional presentation form of media for description. However, this is merely an example and the disclosure is not limited thereto.

The deep neural network performs gait recognition based on gait energy diagrams. Therefore, before gait recognition is performed by using the deep neural network, a first gait energy diagram is pre-extracted from the first video, and a second gait energy diagram is pre-extracted from the second video; then the first gait energy diagram and the second gait energy diagram are inputted into the deep neural network, and a similarity between the two gait energy diagrams is outputted by the deep neural network as a similarity between the foregoing to-be-processed video and the second video.

More specifically, the deep neural network extracts respective identity information of the two inputted gait energy diagrams and a fused gait feature vector of the two gait energy diagrams. Identity information of either of the gait energy diagrams may include: an identifier (ID) of the gait energy diagram, and gait feature vectors extracted based on the gait energy diagram. The fused gait feature vector of the two gait energy diagrams depends on respective gait feature vectors of the two gait energy diagrams.

Subsequently, the deep neural network calculates the similarity between the two gait energy diagrams according to at least the extracted fused gait feature vector.

It can be learned that the deep neural network not only extracts the fused gait feature vector of the object with a to-be-recognized identity and the object with a known identity, but also extracts the identity information (including IDs and the gait feature vectors) of the object with a to-be-recognized identity and the object with a known identity. In addition, the fused gait feature vector depends on the gait feature vectors. Subsequently, the similarity (that is, a similarity between the object with a to-be-recognized identity and the object with a known identity) between the two gait energy diagrams is calculated according to at least the fused gait feature vector, thereby implementing gait recognition on the object with a to-be-recognized identity.

The deep neural network includes neurons in a layered structure. Each neuron layer includes a plurality of filters, and weights and offsets (filter parameters) therebetween may be obtained through training.

Therefore, in an example, the deep neural network may alternatively be trained in advance, and parameters thereof may be adjusted. Descriptions are provided subsequently in this specification.

A video processing apparatus and a video processing device included in the example embodiments for implementing gait recognition in the disclosure are described below.

The video processing apparatus may be applied in the video processing device in a software and/or hardware form. Specifically, the video processing device may be a server or personal computer (PC) providing a gait recognition service, or may be a terminal such as a digital camera, a mobile terminal (for example, a smartphone), or an iPad.

When being applied in the video processing device in a software form, the video processing apparatus may be independent software. The video processing apparatus may alternatively be used as a subsystem (e.g., child component)

of a large-scale system (for example, an operating system), to provide a gait recognition service.

When being applied in the video processing device in a hardware form, the video processing apparatus may be, for example, a controller/processor of a terminal or server.

FIG. 1a to FIG. 1d are example structural diagrams of a video processing application scenario according to example embodiments. Referring to FIG. 1a, a camera 101 shoots a video of a pedestrian in motion (e.g., an object with a to-be-recognized identity), and provides the video to a video processing device 102. The video processing device 102 performs gait recognition based on videos of each of an object with a known identity in a database 103. In this scenario, the video processing device 102 needs to be provided with a module or an apparatus capable of extracting a gait energy diagram.

Figure 1B:
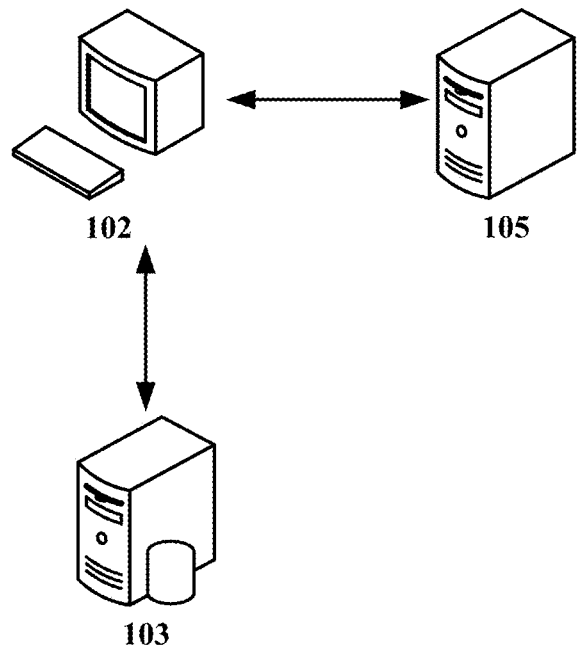

Referring to FIG. 1b for another application scenario of the video processing method, a video processing device 102 shoots a video of a pedestrian in motion (e.g., an object with a to-be-recognized identity), and performs gait recognition based on videos of each of an object with a known identity in a database 103. In this scenario, the video processing device 102 needs to be provided with a photographing apparatus and a module or apparatus capable of extracting a gait energy diagram.

Figure 1C:
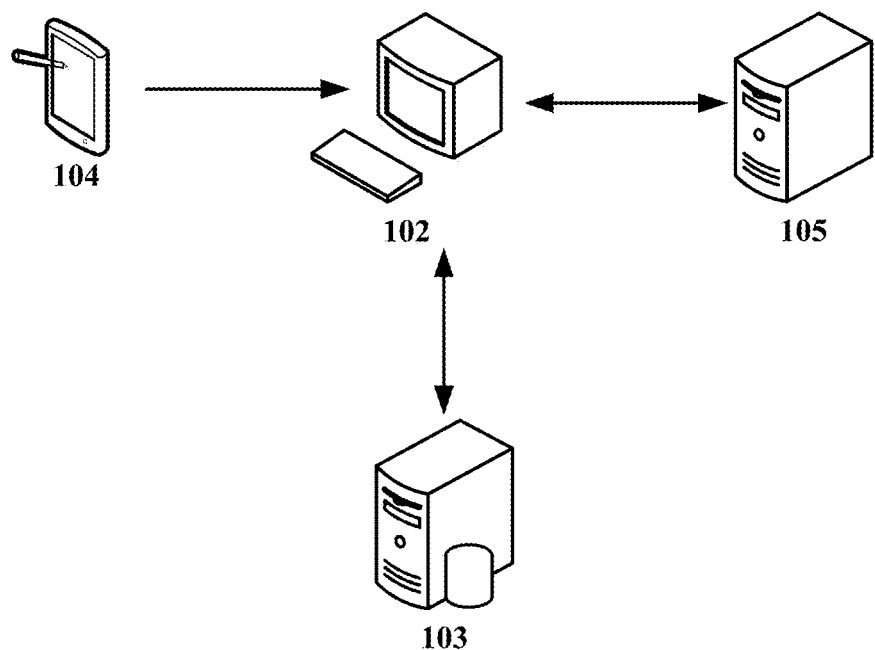

Referring to FIG. 1c for still another application scenario of the video processing method, an external device 104 provides a gait energy diagram or a video of an object with a to-be-recognized identity to a video processing device 102. The video processing device 102 performs gait recognition based on gait energy diagrams of each of an object with a known identity stored in a database 103. In this scenario, if the external device 104 provides a video to the video processing device 102, the video processing device 102 needs to be provided with a module or an apparatus capable of extracting a gait energy diagram from the video.

In addition, if the deep neural network needs to be trained, a training device 105 may be further included in the foregoing scenarios. Functions of the training device 105 may alternatively be implemented by the video processing device 102. The training device 105 may be configured to train the deep neural network, or provides samples used for training.

Figure 1D:
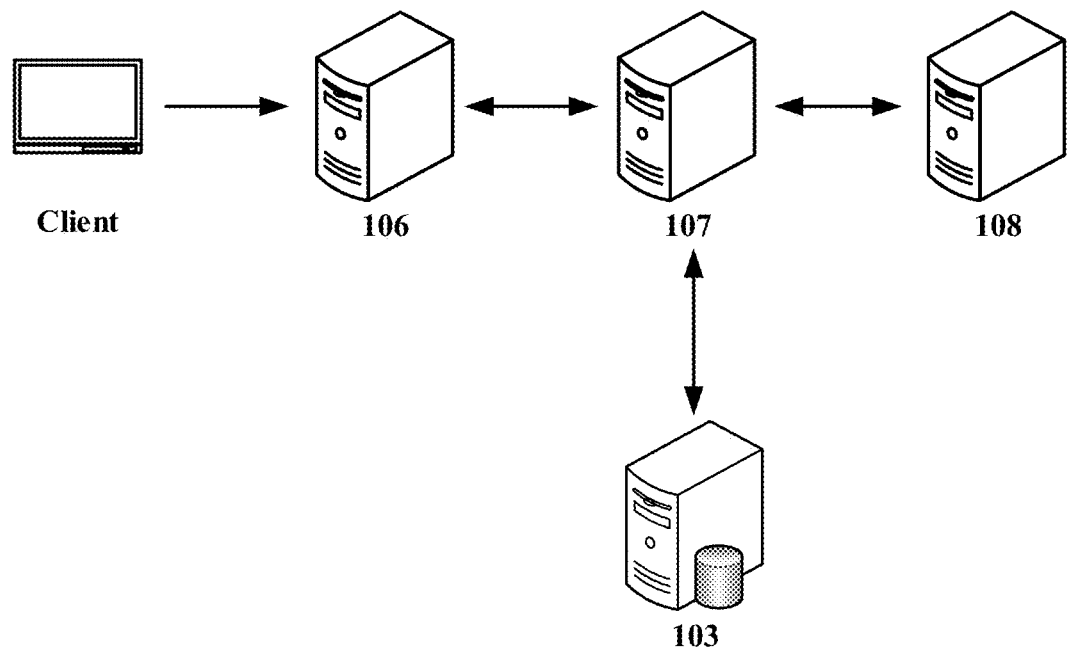

In a more specific scenario (a client-server scenario), referring to FIG. 1d, a web server 106, a video processing server 107 (that is, a video processing device), and a database 103 may be included. In addition, a training server 108 (or a training device) may be further included.

The web server 106 is a front end (foreground), and is responsible for communicating with a client browser (the foregoing external device). The video processing server 107, the database 103, the training server 108, and the like are back ends. The video processing server 107 may provide a video processing (e.g., gait recognition) service to the client browser. The training server 108 may be configured to train a video processing algorithm used by the video processing server 107 (that is, training the deep neural network), or provide samples used for training.

Figure 2A:
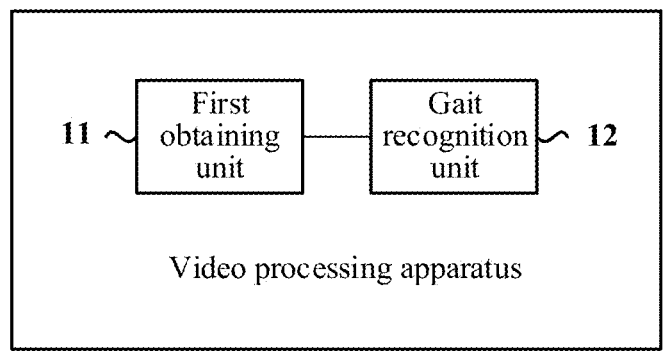
FIG. 2a and FIG. 2b are example structural diagrams of a video processing apparatus according to an example embodiment.

An internal structure of the video processing apparatus is described below. An example structure of the video processing apparatus is shown in FIG. 2a, and includes: a first obtaining unit 11 and a gait recognition unit 12.

The first obtaining unit 11 is configured to:
obtain a to-be-processed video, and generate a first gait energy diagram according to the to-be-processed video; and
obtain a second gait energy diagram, the second gait energy diagram being generated according to a video including an object with a known identity.

The gait recognition unit 12 includes a deep neural network. The deep neural network may be configured to perform first gait recognition on the first gait energy diagram and the second gait energy diagram provided by the first obtaining unit 11.

Figure 2B:
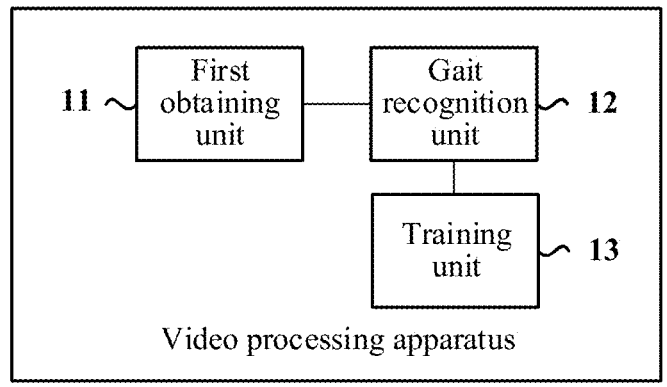

In another embodiment of the disclosure, referring to FIG. 2b, the video processing apparatus may further include: a training unit 13, configured to perform a training process.

Functions of the foregoing units are described subsequently in this specification with reference to the video processing method.

Figure 2C:
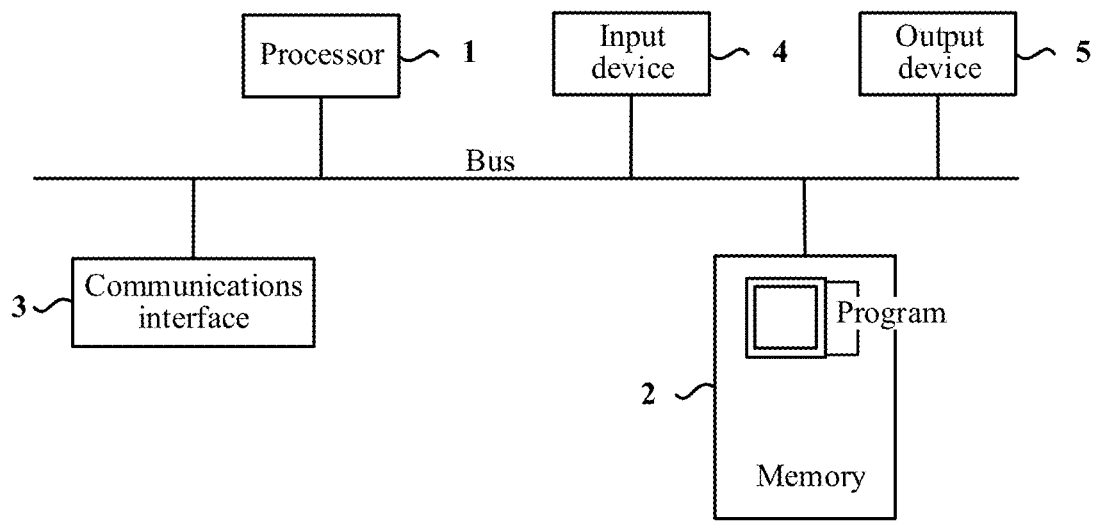
FIG. 2c is an example structural diagram of a video processing device according to an example embodiment.

FIG. 2c shows a possible schematic structural diagram of the video processing device in the foregoing embodiment.

The video processing device includes a bus, a processor 1, a memory 2, a communications interface 3, an input device 4, and an output device 5. The processor 1, the memory 2, the communications interface 3, the input device 4, and the output device 5 are connected to each other through the bus.

The bus may include a path for transferring information between components of a computer system.

The processor 1 may be a general-purpose processor, for example, a general-purpose central processing unit (CPU), a network processor (NP), or a microprocessor, or may be an application-specific integrated circuit (ASIC) or one or more integrated circuits configured to control program execution in the solution in the disclosure. The processor 1 may alternatively be a digital signal processor (DSP), a field programmable gate array (FPGA), or another programmable logic device, discrete gate, or a transistor logic device, or a discrete hardware component.

The memory 2 stores a program or script for executing the technical solution in the disclosure, and may further store an operating system and another key service. Specifically, the program may include program code, and the program code includes a computer operation instruction. The script is normally stored as text (such as ASCII), and is explained or compiled merely when being invoked.

More specifically, the memory 2 may include a read-only memory (ROM), another type of static storage device that may store static information and an instruction, a random access memory (RAM), another type of dynamic storage device that may store information and an instruction, a magnetic disk memory, a flash, or the like.

The input device 4 may include an apparatus for receiving data and information inputted by a user, for example, a keyboard, a mouse, a camera, a voice input apparatus, or a touch screen.

The output device 5 may include an apparatus allowed to output information to a user, for example, a display screen, or a speaker.

The communications interface 3 may include an apparatus using any transceiver or the like, to communicate with another device or a communications network such as an Ethernet, a radio access network (RAN), or a wireless local area network (WLAN).

It may be understood that FIG. 2 shows only a simplified design of the video processing device. In an actual application, the video processing device may include any quantity of transmitters, receivers, processors, controllers, memories, communications interfaces, and the like, and all servers/intelligent terminals that may implement the disclosure shall fall within the protection scope of the disclosure.

The processor 1 may implement the video processing method provided in the following example embodiments by executing the program stored in the memory 2 and invoking another device.

In addition, functions of the units of the video processing apparatus shown in FIG. 1a to FIG. 1d may be implemented by the processor 1 by executing the program stored in the memory 2 and invoking another device.

The example embodiments implementing gait recognition of the disclosure are further described below in detail based on the foregoing common aspects of the disclosure.

Figure 3:
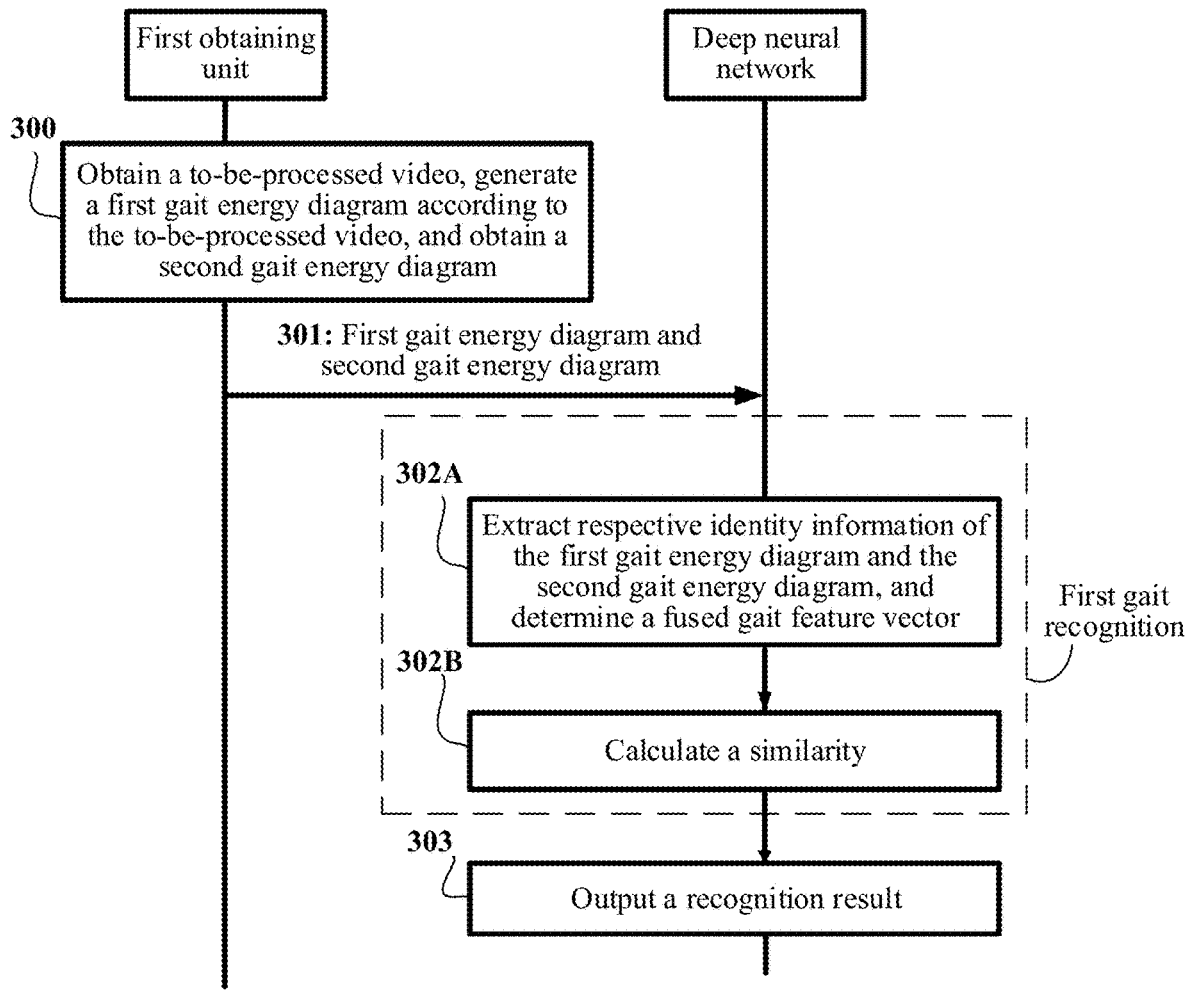
FIG. 3, FIG. 6, and FIG. 9 are example flowcharts of a video processing method according to an example embodiment.

FIG. 3 shows an example flowchart of a video processing method performed by the foregoing video processing apparatus/device. The method may include at least the following operations 300-303:

Operation 300: Obtain a to-be-processed video, generate a first gait energy diagram according to the to-be-processed video, and obtain a second gait energy diagram.

Video frames in the to-be-processed video (first video) include an object with a to-be-recognized identity, and the second gait energy diagram is generated according to a video (second video) of an object with a known identity.

The first gait energy diagram and the second gait energy diagram may each include a uniquely corresponding ID. An ID corresponding to a gait energy diagram may identify an identity of an object corresponding to the gait energy diagram.

Figure 4:
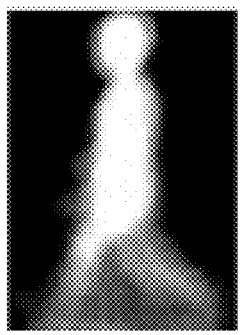
FIG. 4 is a schematic diagram of a gait energy diagram according to an example embodiment.

FIG. 4 is a schematic diagram of a gait energy diagram according to an example embodiment. A plurality of frames of gait silhouettes may be obtained according to video frames, and the plurality of frames of gait silhouettes are combined and normalized to obtain the gait energy diagram.

There may be a plurality of manners for obtaining the first gait energy diagram and the second gait energy diagram, examples of which are described below with reference to various application scenarios in FIGS. 1a-1d.

An application scenario shown in FIG. 1a is used as an example. After shooting a to-be-processed video, the camera 101 may provide the to-be-processed video to the video processing device 102. The video processing device 102 extracts a first gait energy diagram from the to-be-processed video, obtains a second video from the database 103, and obtains a second gait energy diagram from the second video through extraction (or obtains the second gait energy diagram from the database 103).

An application scenario shown in FIG. 1b is used as an example. After a camera of the video processing device 102 shoots a to-be-processed video, the video processing device 102 extracts a first gait energy diagram from the to-be-processed video, obtains a second video from the database 103, and obtains a second gait energy diagram from the second video through extraction (or obtains the second gait energy diagram from the database 103).

An application scenario shown in FIG. 1c is used as an example. After the external device 104 provides a to-be-processed video to the video processing device 102, the video processing device 102 extracts a first gait energy diagram from the to-be-processed video, obtains a second video from the database 103, and obtains a second gait energy diagram from the second video through extraction; or the external device 104 provides the first gait energy diagram to the video processing device 102, and the video processing device 102 obtains the second video from a database 103, and obtains a second gait energy diagram from the second video through extraction; or the external device 104 provides a first gait energy diagram to the video processing device 102, and the video processing device 102 obtains a second gait energy diagram from a database 103.

An application scenario shown in FIG. 1d is used as an example. After a client provides a to-be-processed video to the video processing server 107, the video processing server 107 extracts a first gait energy diagram from the to-be-processed video, obtains a second video from the database 103, and obtains a second gait energy diagram from the second video through extraction; or the client provides a first gait energy diagram to the video processing server 107, and the video processing server 107 obtains a second video from the database 103, and obtains a second gait energy diagram from the second video through extraction; or the client provides a first gait energy diagram to the video processing server 107, and the video processing server 107 obtains a second gait energy diagram from the database 103.

In an example, operation 300 may be performed by the first obtaining unit 11 of the foregoing video processing apparatus; or the to-be-processed video provided by the external device or client may be received by the communications interface 3 of the foregoing video processing device; or the input device 4 (for example, a camera) shoots the to-be-processed video; or the processor 1 obtains the to-be-processed video from a gallery of the memory 2.

The ID may be allocated by the first obtaining unit 11 or the processor 1 described above.

Operation 301: Perform first gait recognition on the first gait energy diagram and the second gait energy diagram according to a deep neural network.

In an example, inputting in operation 301 may be performed by the first obtaining unit 11 of the foregoing video processing apparatus, or be performed by the processor 1.

Operation 302A: Extract respective identity information of the first gait energy diagram and the second gait energy diagram and a fused gait feature vector of the first gait energy diagram and the second gait energy diagram.

Identity information of any gait energy diagram may include: gait feature vectors of the gait energy diagram. Further, the identity information may further include an ID of the gait energy diagram.

For example, identity information of the first gait energy diagram may include: gait feature vectors corresponding to the first gait energy diagram; and identity information of the second gait energy diagram may include: gait feature vectors corresponding to the second gait energy diagram.

The fused gait feature vector depends on a combination of respective gait feature vectors of the first gait energy diagram and the second gait energy diagram. A method of obtaining the fused gait feature vector is further described below in this specification.

More specifically, the deep neural network may include an identity information extraction layer and a fused gait feature vector extraction layer.

The identity information extraction layer may include at least a first extraction layer and a second extraction layer.

Figure 5A:
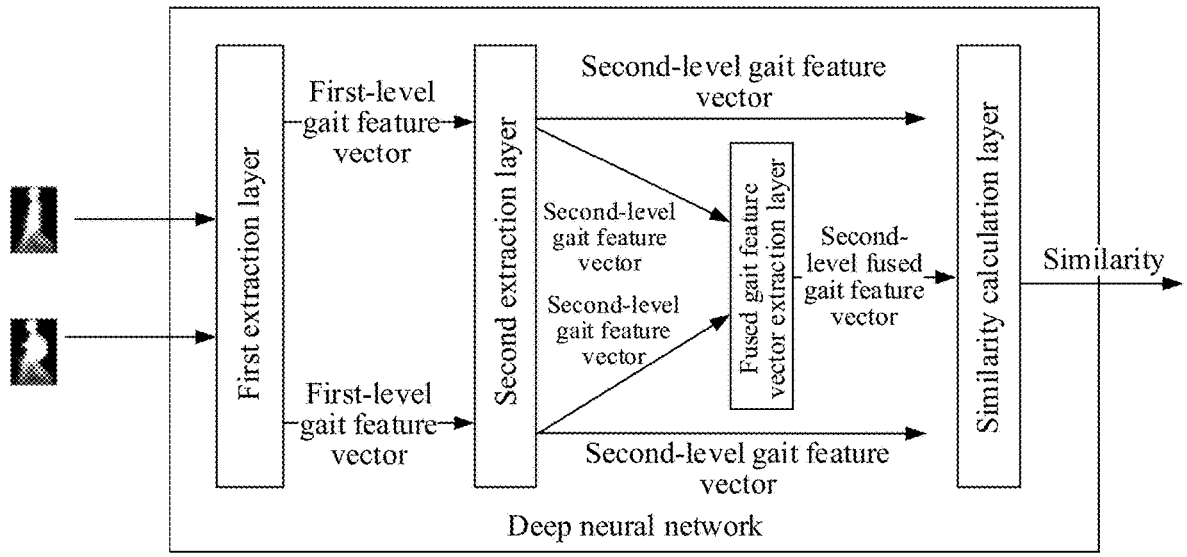
FIG. 5a to FIG. 5c are schematic diagrams of extracting a gait feature vector according to an example embodiment.

In an example, referring to FIG. 5a, the first extraction layer may extract inputted first-level gait feature vectors of gait energy diagrams and input the first-level gait feature vectors into the second extraction layer. The second extraction layer may extract respective second-level gait feature vectors of two gait energy diagrams (for example, the first gait energy diagram and the second gait energy diagram).

The fused gait feature vector extraction layer may fuse the second-level gait feature vectors of the two gait energy diagrams, to obtain a second-level fused gait feature vector.

Figure 5B:
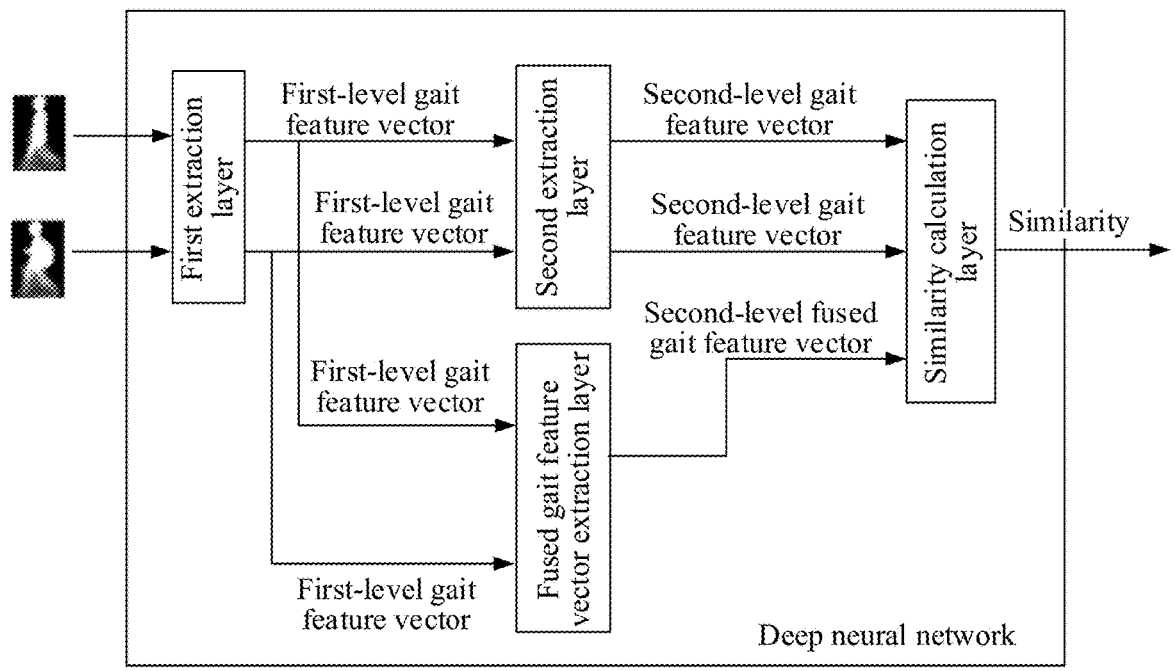

In another example, referring to FIG. 5b, the fused gait feature vector extraction layer may fuse inputted first-level gait feature vectors of two gait energy diagrams (for example, the first gait energy diagram and the second gait energy diagram) of the deep neural network, to obtain a first-level fused gait feature vector, and obtain a second-level fused gait feature vector through extraction according to the first-level fused gait feature vector.

In this example, the fused gait feature vector extraction layer may further include a fusion layer (configured to fuse the first-level gait feature vectors to obtain the first-level fused gait feature vector) and an extraction layer (configured to obtain the second-level fused gait feature vector through extraction according to the first-level fused gait feature vector).

In an example, the first extraction layer and the second extraction layer may be logical layers, and may further include a plurality of feature vector extraction layers, to extract image feature vectors. A feature vector extracted by a feature vector extraction layer closer to input has a lower level, and a feature vector extracted by a feature vector extraction layer closer to output has a higher level.

Figure 5C:
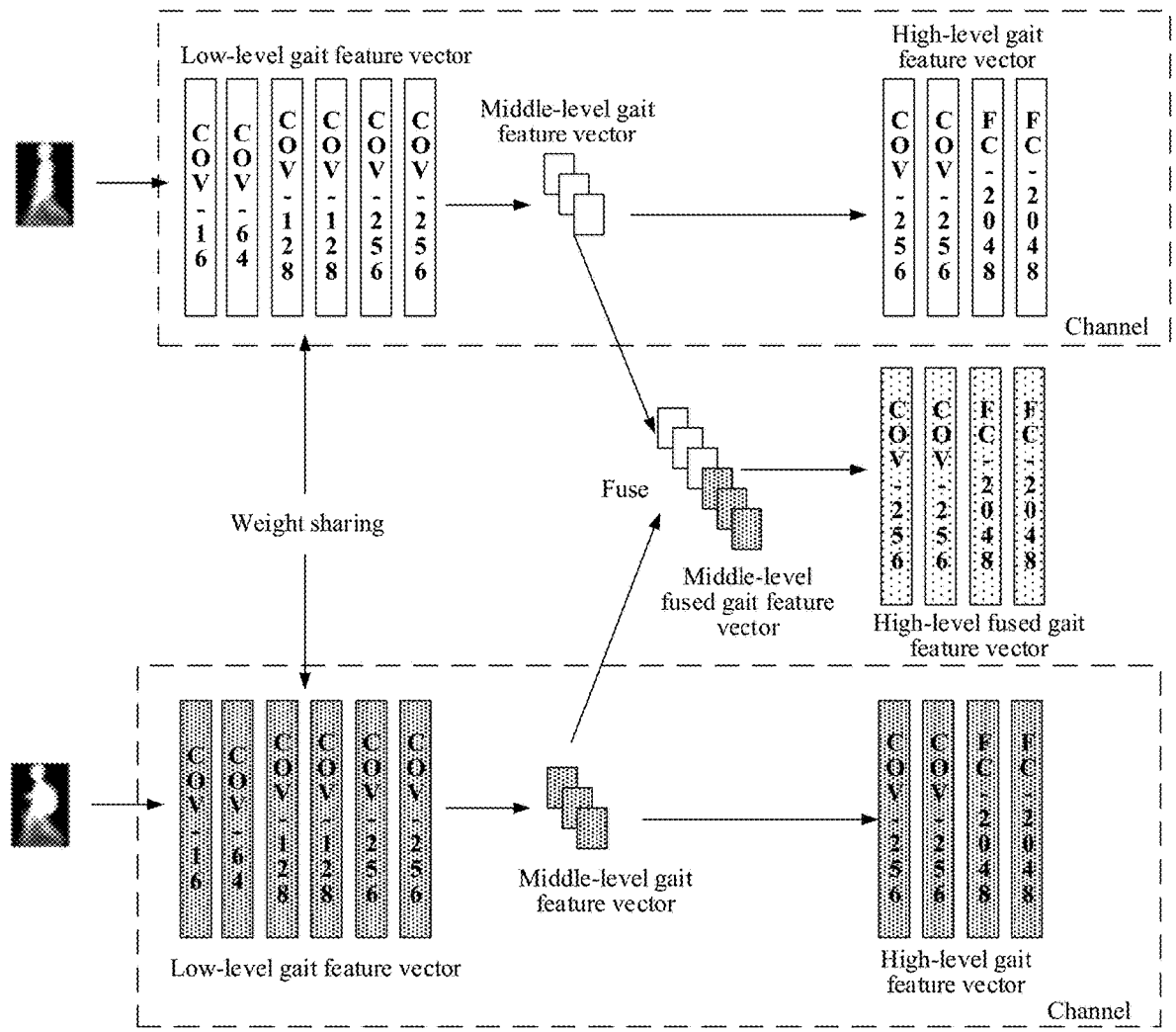

For example, referring to FIG. 5c, identity information extraction layers may separately include two channels (each of the channels includes a first extraction layer and a second extraction layer), configured to respectively extract gait feature vectors of two gait energy diagrams. In either of the channels, low-level gait feature vectors may be first extracted, and gait feature vectors of a higher level are extracted by combining the low-level gait feature vectors. Because the same operation needs to be performed on the two gait energy diagrams, two channels in the first extraction layer may share a weight.

For example, a gait feature vector extracted by a first feature vector extraction layer in a channel has a lowest level, and generally is an edge, an angle, a curve, or the like (corresponding to cov-16, where "cov" represents convolution, 16 represents a quantity of filters, and the quantity of the filters determines dimensionality of the extracted gait feature vectors). A second feature vector extraction layer is configured to extract a combined feature vector (corresponding to cov-64) of gait feature vectors outputted by the first extraction layer, and the remaining may be deduced by analogy. Therefore, levels of extracted gait feature vectors may be from a low level to a middle level to a high level/abstract (semantic level), where in FIG. 5c, "FC" represents a connection layer, "FC-2048" represents a connection layer having 2048 neurons, and an extracted feature vector has 2048 dimensions. The low level and the middle level may be collectively referred to as a first level.

The fused gait feature vector extraction layer (may also be considered as another channel independent of the two channels of the identity information extraction layer) may string low-level gait feature vectors together to obtain a low-level fused gait feature vector, and further extract a fused gait feature vector of a higher level (a middle-level fused gait feature vector) until a high-level fused gait feature vector is obtained.

Alternatively, the fused gait feature vector extraction layer may string middle-level gait feature vectors together to obtain a middle-level fused gait feature vector, and further extract a fused gait feature vector of a higher level.

Alternatively, the fused gait feature vector extraction layer may directly string high-level gait feature vectors together to obtain a high-level fused gait feature vector.

As shown in FIG. 5c, low-level fused gait feature vectors and middle-level gait feature vectors are collectively referred to as first-level gait feature vectors. It may alternatively be considered that the first-level gait feature vectors include a final middle-level gait feature vector.

In a scenario in which the fused gait feature vector extraction layer strings low-level gait feature vectors together to obtain a low-level fused gait feature vector, the first-level gait feature vectors may merely include the low-level gait feature vectors.

A person skilled in the art may design with flexibility according to a need, and details are not described herein again.

In addition, the example shown in FIG. 5c may alternatively be understood as: first 6 layers of network structures each extract respective gait feature vectors of a pair of gait energy diagrams, and subsequently, the process is divided into two parts of independent operations. The first part of operation includes: in the seventh-layer network structure, fusing the respective gait feature vectors, to obtain a fused gait feature vector, and further performing extraction of a higher level on the fused gait feature vector. The second part of operation includes: continuing to extract respective gait feature vectors of a pair of gait energy diagrams, to obtain a second-level fused gait feature vector or a final high-level gait feature vector.

In an example embodiment, the deep neural network may adjust parameters thereof through training in advance.

In addition, when the deep neural network in an example embodiment performs parameter adjustment during a training process, not only a fused gait feature vector of different gait energy diagrams is considered, but also implicit identity information of the gait energy diagrams is considered. The deep neural network trained in this way may more effectively extract gait feature vectors that more distinctive. In addition, because a fused gait feature vector depends on a combination of gait feature vectors of two gait energy diagrams, the fused gait feature vector is more distinctive, so that a more accurate similarity between the two gait energy diagrams (or a similarity between the object with a to-be-recognized identity and the object with a known identity) may be obtained.

Operation 302B: Calculate a similarity according to at least the extracted fused gait feature vector.

The similarity may be specifically a percentage, and represents a probability that the object with a to-be-recognized identity and the object with a known identity correspond to a same object. For example, if the similarity is 60%, it represents that there is a probability of 60% that the object with a to-be-recognized identity and the object with a known identity are the same person.

In an example, the similarity may be calculated according to only the fused gait feature vector.

In another example, alternatively, a first similarity may be calculated according to the fused gait feature vector, and a second similarity may also be calculated according to the identity information of the two gait energy diagrams; and then weighted summation is performed on the first similarity and the second similarity (e.g., the most simple weighted summation may be to add up the first similarity and the second similarity, and then divide the sum by 2, to obtain an average value), to obtain a final similarity.

For example, assuming that the first similarity is calculated to be 80% according to the fused gait feature vector, and the second similarity is calculated to be 60% according to the identity information, the final similarity is (80%+60%)/2=70%.

The above are merely examples and there are a plurality of other manners of calculating the similarity according to the disclosure, and details are not described herein again.

Operation 302A and operation 302B are the first gait recognition performed by the deep neural network. In an example, operation 302A and operation 302B may be performed by the gait recognition unit 12 of the video processing apparatus, or be performed by the processor 1 of the video processing device.

In another example, referring to FIG. 5a and FIG. 5b, the deep neural network may include a similarity calculation layer. Operation 302B may be performed by the similarity calculation layer.

Operation 303: The deep neural network outputs a recognition result. The recognition result includes the similarity, or the recognition result includes information indicating whether the object with a to-be-recognized identity and the object with a known identity are the same object.

In an example, the recognition result may include the similarity.

In addition, the recognition result may also include information identifying whether the two inputted gait energy diagrams belong to the same object. For example, a value "1" may be used for representing that the two gait energy diagrams belong to the same object, and "0" may be used for representing that the two gait energy diagrams belongs to different objects.

More specifically, the deep neural network may output a recognition result each time after performing first gait recognition on a set of (two) gait energy diagrams.

Alternatively, the deep neural network may output a recognition result after completing a batch of first gait recognitions.

For example, assuming that an identity of an object A is to be recognized, and there are 10 videos of each of an object with a known identity in a database, then 10 second gait energy diagrams may be obtained. According to a specific sequence, the deep neural network may calculate similarities between a first gait energy diagram of the object A and the 10 second gait energy diagrams one by one. Only after calculation is completed, the deep neural network outputs a recognition result. Therefore, the recognition result may include 10 similarities between the two gait energy diagrams. The recognition result may also include information identifying whether two gait energy diagrams belong to the same object.

In another example, the recognition result includes information indicating whether the object with a to-be-recognized identity and the object with a known identity are the same object. For example, the recognition result includes a probability that the first gait energy diagram and the second gait energy diagram belong to different objects. The probability may be calculated by using "1-similarity". For example, if the similarity between the first gait energy diagram and the second gait energy diagram is 80%, then the probability that the first gait energy diagram and the second gait energy diagram belong to different objects is 20%.

In order to determine whether the first gait energy diagram and the second gait energy diagram belong to the same object, the following operations may be performed:

If the similarity meets a recognition condition, it is determined that the first gait energy diagram and the second gait energy diagram correspond to the same object. That is, a unique ID corresponding to the second gait energy diagram may identify the identity of the object with a to-be-recognized identity. Otherwise, it is determined that the first gait energy diagram and the second gait energy diagram correspond to different objects.

The recognition condition includes: a similarity is not less than a similarity threshold or a similarity is greater than the similarity threshold.

For example, assuming that the similarity threshold is 80%, if the similarity between the two gait energy diagrams is 70%, it is considered that the object with a to-be-recognized identity and the object with a known identity are not the same person; and if the similarity between the two gait energy diagrams is greater than (or equal to) 80%, it is considered that the object with a to-be-recognized identity and the object with a known identity are the same person. Therefore, the unique ID corresponding to the second gait energy diagram may identify the identity of the object with a to-be-recognized identity.

As described above, the database stores videos or gait energy diagrams of each of an object with a known identity. Therefore, in another embodiment of the disclosure, similarities between second gait energy diagrams of each of an object with a known identity a in the database and a first gait energy diagram may be calculated one by one until a similarity between a second gait energy diagram of an object with a known identity and the first gait energy diagram meets the recognition condition or similarities between all second gait energy diagrams of each of an object with a known identity are known and the first gait energy diagram are calculated.

For example, an identity of an object A is to be recognized, and there are 10 videos of each of an object with a known identity in the database. Therefore, according to a sequence, similarities between a first gait energy diagram of the object A and 10 second gait energy diagrams of each of an object with a known identity are known are calculated one by one until there is a similarity meeting the recognition condition or 10 similarities are calculated.

In another embodiment of the disclosure, alternatively, after calculation of similarities between all of second gait energy diagrams of each of an object with a known identity and a first gait energy diagram is completed, whether two gait energy diagrams belong to the same object is determined according to the recognition condition.

In addition, according to a need, the deep neural network may alternatively output respective gait feature vectors of two gait energy diagrams. For example, in the training process, the deep neural network may output respective gait feature vectors of gait energy diagrams, to facilitate calculation of a loss value.

Based on the above, the deep neural network in an example embodiment performs filter parameter adjustment according to identity information and a similarity during the training process. That is, during the parameter adjustment, not only a fused gait feature vector of different gait energy diagrams is considered, but also implicit identity information of the gait energy diagrams is considered. In this way, a gait feature vector that is more distinctive may be more effectively extracted. Because a fused gait feature vector depends on gait feature vectors of two gait energy diagrams, the fused gait feature vector is more distinctive, so that a more accurate similarity calculation between gait energy diagrams may be possible.

A method of training the deep neural network is described below.

There are a plurality of filters in the deep neural network, and a main objective of training is to adjust filter parameters. Therefore, a training or optimization process of the deep neural network may also be understood as a process of adjusting the filter parameters to minimize a loss value of a loss function (a smaller loss value means that a corresponding prediction/output result is closer to an actual result).

In the related art training process, most used loss functions reflect a classification loss, that is, determining categories of two gait energy diagrams (the category herein refers to distinguishing different people), and it cannot be ensured that extracted gait feature vectors corresponding to the same person are as similar to each other as much as possible, and extracted gait feature vectors from different people are as far away (or different) from each other as much as possible. Therefore, it cannot be ensured that the extracted gait feature vectors are sufficiently distinctive.

To solve the foregoing problem, a training objective of the training process provided in an example embodiment of this application includes: making gait feature vectors extracted from different gait energy diagrams of a same object be similar, and making gait feature vectors extracted from gait energy diagrams of different objects be far away from each other.

In addition, an example embodiment of this application further provides new loss functions, to achieve the training objectives through training.

The new loss functions include an identity information loss function and a fused gait feature vector loss function.

Figure 6:
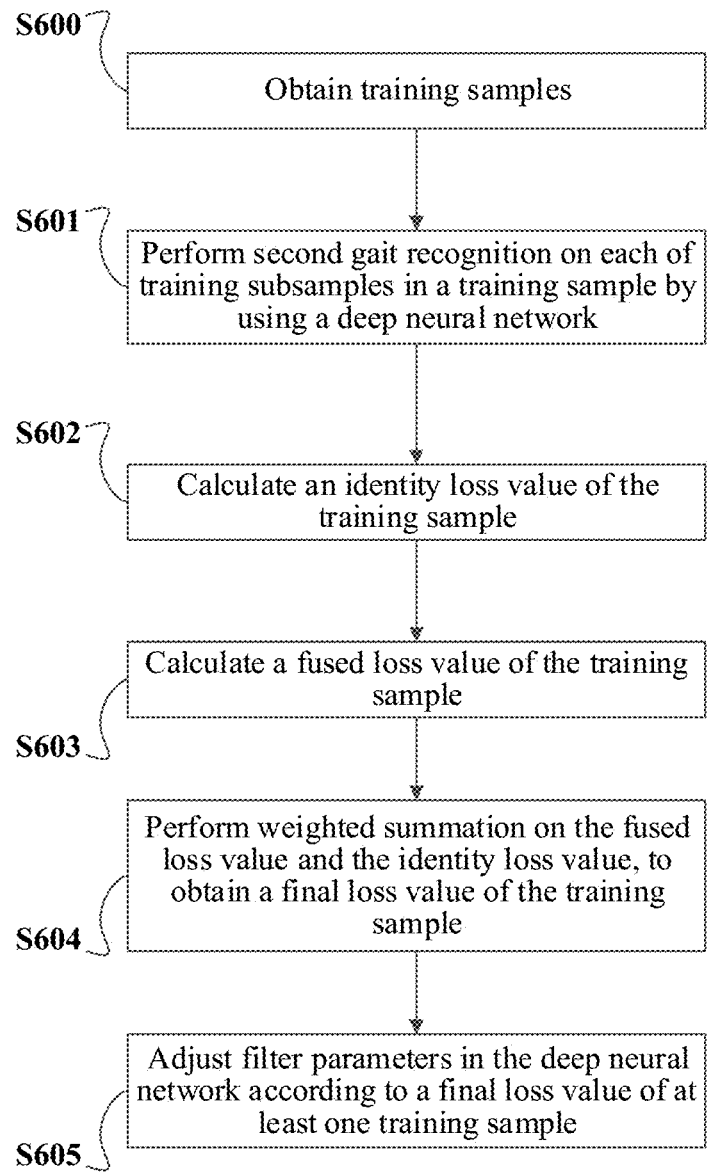
Figure 7:
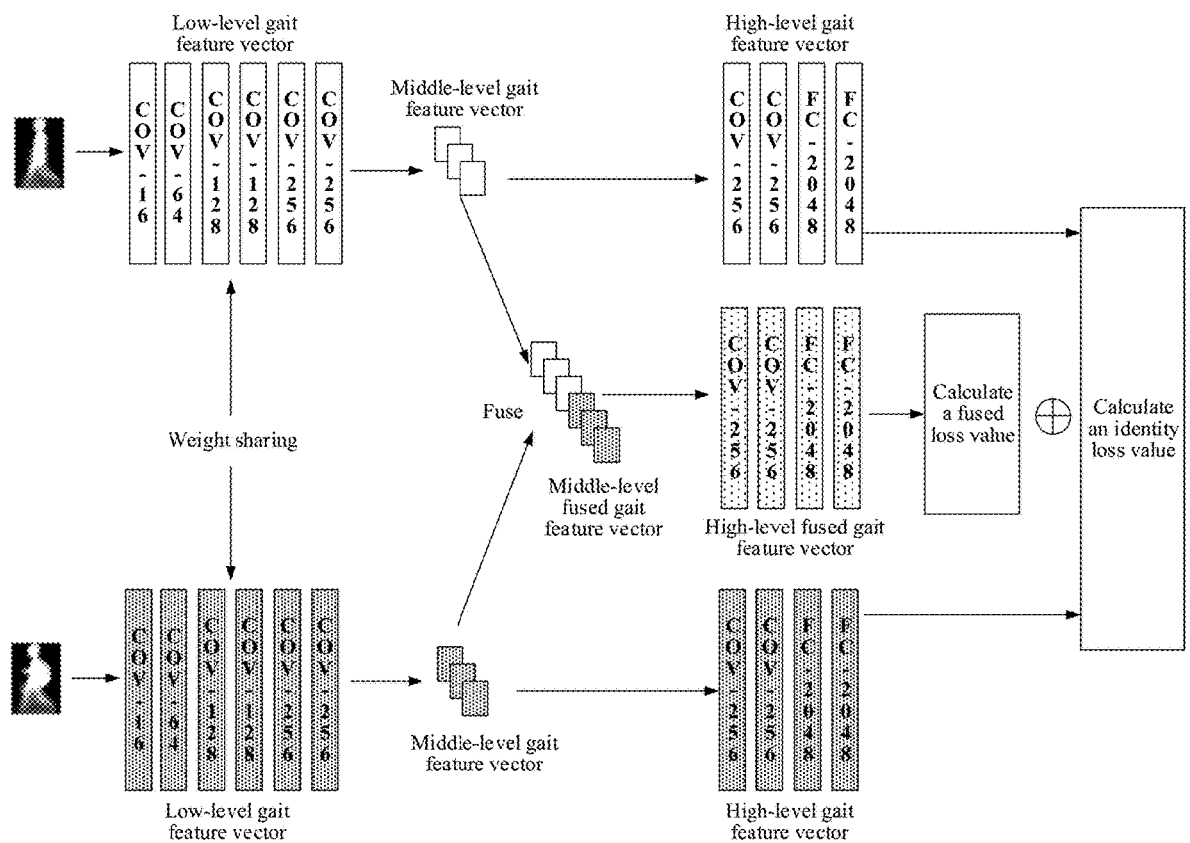
FIG. 7 and FIG. 8 are schematic diagrams of a training process according to an example embodiment.

FIG. 6 and FIG. 7 show an example training process based on the new loss functions. The process may include at least the following operations S600-S605.

S600: Obtain training samples.

Each of the training samples may include n training sub samples, and any one of the training subsamples may include two (a pair of) gait energy diagrams of each of an object with a known identity. n may be a positive integer Specifically, S600 may be performed by the foregoing first obtaining unit 11, the training unit 13, or the processor 1.

S601: A deep neural network performs second gait recognition on each of the training subsamples in the training sample.

The second gait recognition may include: extracting respective identity information of two gait energy diagrams in the training subsample and a fused gait feature vector of the two gait energy diagrams, and calculating a similarity of the two gait energy diagrams according to at least the extracted fused gait feature vector.

The second gait recognition is similar to the foregoing first gait recognition. For specific details, reference may be made to descriptions of operation 302A and operation 302B, and the details are not described herein again.

S601 may be performed by the foregoing gait recognition unit 12, the training unit 13, or the processor 1.

S602: Calculate, according to the identity information extracted in the gait recognition, an identity loss value of the training sample by using an identity information loss function.

A smaller identity loss value represents that gait feature vectors extracted from different gait energy diagrams of a same object are more similar, and gait feature vectors extracted from gait energy diagrams of different objects are farther away from each other.

S603: Calculate a fused loss value of the training samples.

Sequences for performing S602 and S603 may be interchanged, and S602 and S603 may alternatively be performed in parallel.

S604: Perform weighted summation on the fused loss value and the identity loss value, to obtain a final loss value of the training sample.

For example, assuming that a is used for representing the fused loss value, b is used for representing the identity loss value, and c is used for representing the final loss value, a relationship among a, b, and c may be: $c = a + \eta_u \times b$, or $c = \eta_c a + b$, or $c = \eta_c a + \eta_u \times b$.

A person skilled in the art may design values of $\eta_u$ and $\eta_c$ with flexibility according to a need, and details are not described herein again.

S605: Adjust filter parameters of the deep neural network according to a final loss value of at least one training sample.

In an example embodiment, to save time and improve efficiency, after a plurality of training samples (for example, 64 samples) are trained, the filter parameters may be jointly adjusted once. Therefore, after final loss values of the training samples are respectively calculated, the filter parameters may be adjusted according to the final loss values.

S602 to S605 may be performed by the foregoing training unit 13 or the processor 1.

In an example embodiment, a training objective that gait feature vectors extracted from different gait energy diagrams of a same object are similar, and gait feature vectors extracted from gait energy diagrams of different objects are far away from each other is used for training the deep neural network, so that extracted gait feature vectors of the same person may be as similar as possible, and extracted gait feature vectors from different people may be as far away from each other as possible. Therefore, the extracted gait feature vectors are distinctive, so that more accurate similarity calculation between gait energy diagrams may be possible.

As described above, a training sample may include n training subsamples. An example in which one training sample includes 3 subsamples (that is, includes 3 pairs of gait energy diagrams) is used below for describing the training process more specifically.

Figure 8:
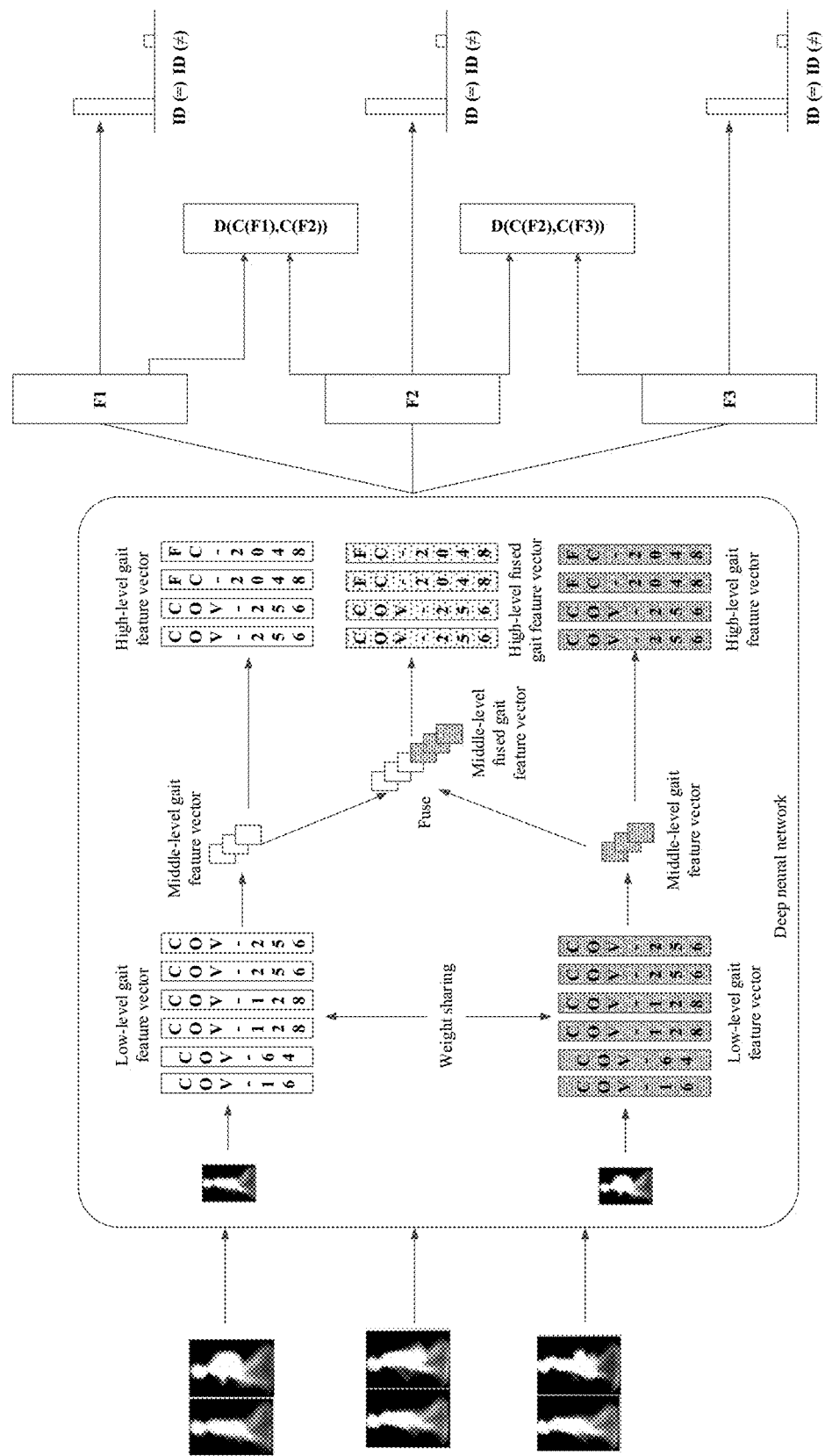
Figure 9:
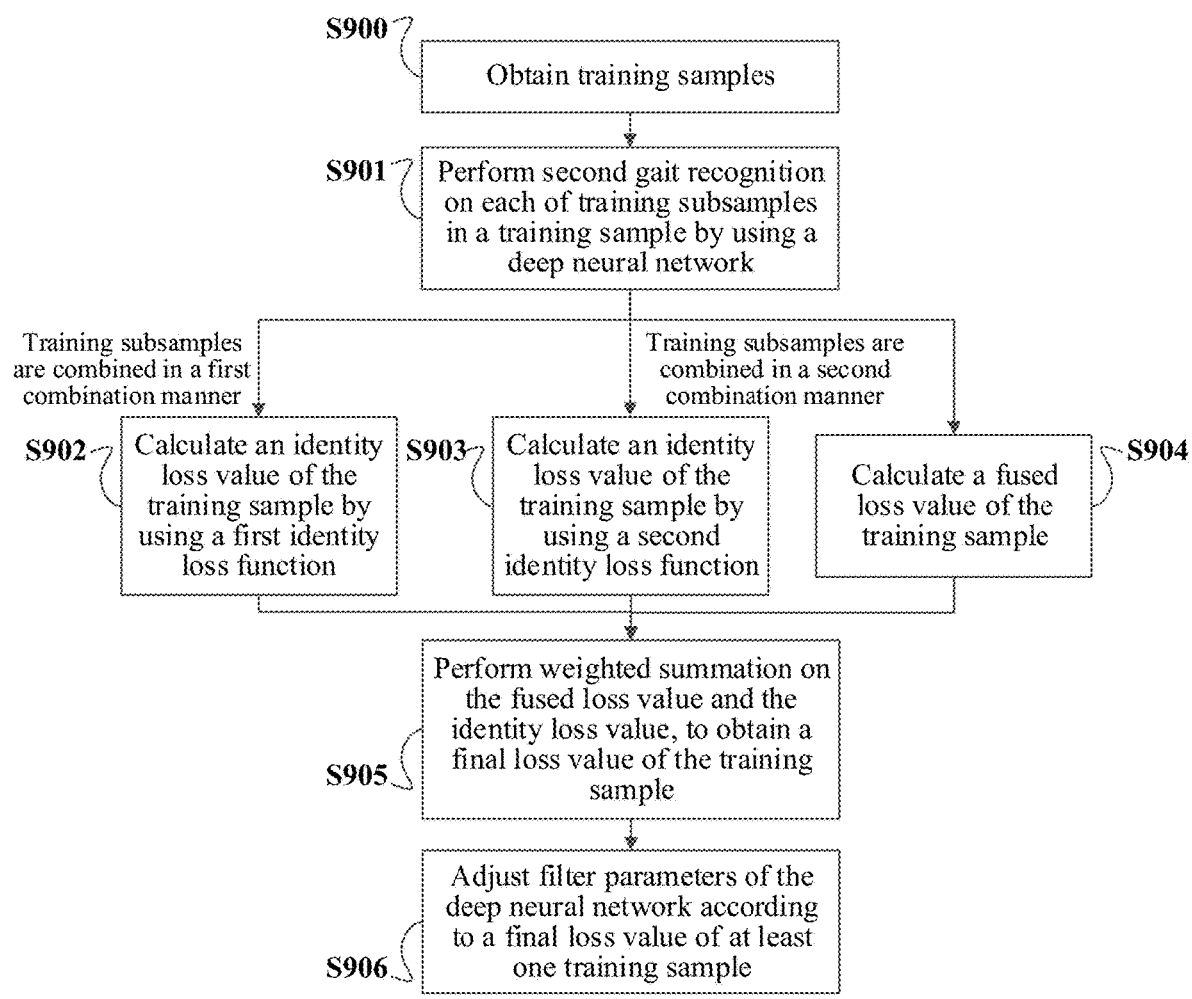

For the case in which one training sample includes 3 subsamples, FIG. 8 shows a training architecture. FIG. 9 shows an example training process based on the new loss functions. The process may include at least the following operations S900-S906:

S900: Obtain training samples.

In an example embodiment, each training sample includes a first training subsample, a second training subsample, and a third training subsample (first, second, and third are only used for distinguishing, and do not represent a sequence of being inputted into a deep neural network). A combination manner of the first training subsample, the second training subsample, and the third training subsample may include:

a first combination manner: two gait energy diagrams in the first training subsample corresponding to a same object; two gait energy diagrams in the second training subsample corresponding to different objects; and two gait energy diagrams in the third training subsample corresponding to different objects; and a second combination manner: two gait energy diagrams in the first training subsample corresponding to a same object; two gait energy diagrams in the second training subsample corresponding to the same object; and two gait energy diagrams in the third training sub sample corresponding to different objects.

Specifically, S900 may be performed by the foregoing first obtaining unit 11, the training unit 13, or the processor 1.

S901: A deep neural network performs second gait recognition on each of the training subsamples in the training sample.

With respect to a method of performing the second gait recognition, reference may be made to descriptions of operation 302A and operation 302B, and the details are not described herein again.

S901 may be performed by the foregoing gait recognition unit 12, the training unit 13, or the processor 1.

S902: Calculate an identity loss value of the training sample by using a first identity loss function in a case that a combination manner of first training subsample, the second training subsample, and the third training subsample in the training sample is the first combination manner.

The first identity loss function is:

$$Lu=\max([1+\|U(Xp)-U(Xg)\|_2^2-\|U(Xp')-U(Xg')\|_2^2], 0)+\eta\max([1+\|U(Xp)-U(Xg)\|_2^2-\|U(Xp'')-U(Xg'')\|_2^2],0)$$

where Lu represents the identity loss value, η represents a coefficient (whose value range is from 0 to 1), and $\|*\|_2^2$ represents a Euclidean distance; p, g, p', g', p'' and g'' represent IDs of gait energy diagrams; Xp and Xg represent a pair of gait energy diagrams in the first training subsample (Xp may also be referred to as a first gait energy diagram, and Xg may also be referred to as a second gait energy diagram); Xp' and Xg' represent a pair of gait energy diagrams in the second training subsample (Xp' may also be referred to as a third gait energy diagram, and Xg' may also be referred to as a fourth gait energy diagram); Xp'' and Xg'' represent a pair of gait energy diagrams in the third training subsample (Xp'' may also be referred to as a fifth gait energy diagram, and Xg'' may also be referred to as a sixth gait energy diagram); in addition, Xp and Xp' correspond to a same object, and Xp and Xp'' correspond to different objects; and U(Xp) to U(Xg'') represent gait feature vectors of the gait energy diagrams.

$\|U(Xp)-U(Xg)\|_2^2$ in the first identity loss function represents a Euclidean distance of the two gait feature vectors in the first training subsample. Because Xp and Xg correspond to a same object, to make gait feature vectors extracted from different gait energy diagrams of the same object be similar, $\|U(Xp)-U(Xg)\|_2^2$ is enabled to be as small as possible (approaching 0) by adjusting filter parameters. Xp' and Xg' correspond to different objects, to make gait feature vectors extracted from gait energy diagrams of different objects be far away from each other, $\|U(Xp')-U(Xg')\|_2^2$ is enabled to be as large as possible (approaching 1) by adjusting the filter parameters.

Further, when $\|U(Xp)-U(Xg)\|_2^2$ is as small as possible, and $\|U(Xp'')-U(Xg'')\|_2^2$ is as large as possible, "$1+\|U(Xp)-U(Xg)\|_2^2-\|U(Xp')-U(Xg')\|_2^2$" in the first identity loss function may also be as small as possible.

Similarly, when $\|U(Xp)-U(Xg)\|_2^2$ is as small as possible, and $\|U(Xp'')-U(Xg'')\|_2^2$ is as large as possible, "$1+\|U(Xp)-U(Xg)\|_2^2-\|U(Xp'')-U(Xg'')\|_2^2$" in the first identity loss function may also be as small as possible.

It can be learned that the first identity loss function reflects the training objective: gait feature vectors extracted from different gait energy diagrams of a same object are similar, and gait feature vectors extracted from gait energy diagrams of different objects are far away from each other.

S903: Calculate an identity loss value of the training sample by using a second identity loss function in a case that a combination manner of first training subsample, the second training subsample, and the third training subsample in the training sample is the second combination manner.

The second identity loss function may be:

$$Lu=\max([1+\|U(Xp)-U(Xg)\|_2^2-\|U(Xp'')-U(Xg'')\|_2^2], 0)+\eta\max([1+\|U(Xp')-U(Xg')\|_2^2-\|U(Xp'')-U(Xg'')\|_2^2],0)$$

where Xp and Xp' correspond to a same object, and Xp and Xp'' correspond to different objects.

In the second combination manner, Xp and Xg correspond to a same object, Xp' and Xg' correspond to a same object, and Xp and Xp'' correspond to different objects, so that $\|U(Xp'')-U(Xg'')\|_2^2$ is expected to be as large as possible, and is to be used as a minuend.

The second identity loss function also reflects the training objective: gait feature vectors extracted from different gait energy diagrams of a same object are similar, and gait feature vectors extracted from gait energy diagrams of different objects are far away from each other.

S904: Calculate a fused loss value of the training sample by using a fused gait feature vector loss function.

In an example, a fused loss subvalue corresponding to each of the training subsamples may be calculated, and then, the fused loss subvalues of the training subsamples are accumulated, to obtain the fused loss value.

The fused gait feature vector loss function may have a plurality of presentation forms.

If a cross entropy is calculated as the fused loss value, in an example, a fused gait feature vector loss function for calculating a fused loss subvalue (cross entropy) of a training subsample may be: $Lc=-P(x_{ab})\log Q(x_{ab})$ where a and b represent IDs of a pair of gait energy diagrams in any of the training subsamples, $x_{ab}$ represents a pair of gait energy diagrams in the training subsample, $P(x_{ab})$ represents a distribution of labels (an actual result/true label distribution) corresponding to the pair of gait energy diagrams, and $Q(x_{ab})$ represents a prediction result (predicted recognition result) of a to-be-trained deep neural network.

For example, if the two gait energy diagrams a and b correspond to a same object, a true label distribution thereof is "1, 0", where "1" represents that a probability that the two gait energy diagrams are from a same object is 100%, and "0" represents that a probability that the two gait energy diagrams are from different objects is 0%.

Assuming that the predicted recognition result is "0.7, 0.3", then a cross entropy between "1, 0" and "0.7, 0.3" may be calculated.

If the two gait energy diagrams a and b correspond to different objects, a true label distribution thereof is "0, 1", where "0" represents that a probability that the two gait energy diagrams are from a same object is 0%, and "1" represents that a probability that the two gait energy diagrams are from different objects is 100%.

Assuming that the predicted recognition result is "0.7, 0.3", then a cross entropy between "0, 1" and "0.7, 0.3" may be calculated.

In another example, the fused gait feature vector loss function may include a first fused gait feature vector loss function and a second fused gait feature vector loss function according to the foregoing different combination manners (e.g., the first combination manner and the second combination manner).

Corresponding to the foregoing first combination manner, the first fused gait feature vector loss function is:

$$Lc=-[(P(x_{pg})\log Q(x_{pg})+P(x_{p'g'})\log Q(x_{p'g'}))+\mu g(x_{pg})\log Q(x_{pg})+P(x_{p''g''})\log Q(x_{p''g''}))+\eta_c g\{\|\delta-D[C(x_{pg},x_{pp'}),C(x_{pg},x_{pg''})]+D[C(x_{pg},x_{pp'}),C(x_{pg},x_{gp'})]\|_+ +\mu g\|\delta-D[C(x_{pg},x_{pp'}),C(x_{pg},x_{pg'})]+D[C(x_{pg},x_{pp'}),C(x_{pg},x_{gp'})]\|_+\}$$

where Lc represents the fused loss value, μ and $\eta_c$ represents weight coefficients, and a value range thereof is from 0 to 1, and δ represents a relaxation factor, and a value range thereof is from 0 to 1, max(*, 0); $\|*\|_+$ represents comparing a value with 0, and selecting the greater one of the value and 0, that is, $x_{pg}$ represents a pair of gait energy diagrams including a gait energy diagram P and a gait energy diagram g, by analogy, $x_{pg}$ and $x_{gp'}$ represent pairs of gait energy diagrams, and C(*) is a probability calculation function, used for calculating a probability that two pairs of gait energy diagrams have a same label distribution; using $C(x_{pg}, x_{p''g''})$ as an example, a probability that a pair of gait energy diagrams $x_{pg}$ and a pair of gait energy diagrams $x_{p''g''}$ have a same label distribution is calculated; and using $C(x_{pg}, x_{pg''})$ as an example, a probability that a pair of gait energy diagrams $x_{pg}$ and a pair of gait energy diagrams $x_{pg''}$ have a same label distribution is calculated.

As described above, if two gait energy diagrams correspond to a same object, a label distribution thereof is "1, 0"; otherwise, a label distribution thereof is "0, 1".

Using a pair of gait energy diagrams $x_{pg}$ as an example, if a gait energy diagram p and a gait energy diagram g correspond to a same object, a true label distribution of $x_{pg}$ is "1, 0"; and if the gait energy diagram P and the gait energy diagram g correspond to different objects, a label distribution of $x_{pg}$ is "0, 1". Similarly, a true label distribution of another pair of gait energy diagrams may be deduced.

D[*] represents a Euclidean distance, and using $D[C(x_{pg}, x_{p''g''}), C(x_{pg}, x_{pg''})]$ as an example, a distance between a probability a and a probability b is calculated. The probability a is a probability that $x_{pg}$ and $x_{p''g''}$ have a same label distribution, and the probability b is a probability that $x_{pg}$ and $x_{pg''}$ have a same label distribution.

Theoretically, if $x_{pg}$ and $x_{p''g''}$ have a same label distribution (for example, both being "1, 0" or "0, 1"), and $x_{pg}$ and $x_{pg''}$ have a same label distribution, $D[C(x_{pg}, x_{p''g''}), C(x_{pg}, x_{pg''})]$ shall be 0.

Alternatively, if $x_{pg}$ and $x_{p''g''}$ have different label distributions, and $x_{pg}$ and $x_{p''g''}$ also have different label distributions, $D[C(x_{pg}, x_{p''g''}), C(x_{pg}, x_{pg''})]$ shall be 0.

If $x_{pg}$ and $x_{p''g''}$ have a same label distribution (for example, both being "1, 0" or "0, 1"), but $x_{pg}$ and $x_{pg''}$ have different label distributions, or $x_{pg}$ and $x_{p''g''}$ have different label distributions, but $x_{pg}$ and $x_{pg''}$ have a same label distribution, a greater $D[C(x_{pg}, x_{p''g''}), C(x_{pg}, x_{pg''})]$ is more desirable.

Ian example embodiment, in the first combination manner, P, g, and p' correspond to a same object; "P, g', p'', and g''''", "g, g', p'', and g''''" or "g', p'', and g''''" correspond to different objects. Therefore, any two gait energy diagrams may be selected from P, g, and p' for combination, to obtain a pair of gait energy diagrams whose label distribution is "1, 0"; and similarly, any two gait energy diagrams may be selected from "P, g', p'', and g''''", "g, g', p'', and g''''" or "g', p'', and g''''" for combination, to obtain a pair of gait energy diagrams whose label distribution is "0, 1". According to a same-label-distribution relationship or a different-label-distribution relationship between pairs of gait energy diagrams, the pairs of gait energy diagrams are filled into different positions of a C function, so that another first fused gait feature vector loss function may be obtained.

Based on the above, if two pairs of gait energy diagrams in the C function are considered as one calculation sample, D[*] calculates a distance between probabilities that two calculation samples have a same label distribution.

Therefore, in training, the filter parameters are adjusted to achieve the following training objective:

For two calculation samples, in a case that two pairs of gait energy diagrams in a first calculation sample have a same true label distribution, and two pairs of gait energy diagrams in a second calculation sample have different true label distributions, a first probability corresponding to the first calculation sample is far away from a second probability corresponding to the second calculation sample; otherwise, the first probability is close to the second probability. The first probability is a probability that the two pairs of gait energy diagrams in the first calculation sample have a same label distribution, and the second probability is a probability that the two pairs of gait energy diagrams in the second calculation sample have a same label distribution.

Corresponding to the second combination manner, the second fused gait feature vector loss function meeting the foregoing training objective is:

$$Lc = -[(P(x_{pg})\log Q(x_{pg}) + P(x_{p'g'})\log Q(x_{p'g'})) + \mu g(P(x_{pg})\log Q(x_{pg}) + P(x_{p''g''})\log Q(x_{p''g''})) + \eta_c g\{\|\delta - D[C(x_{pg}, x_{pp'}), C(x_{pg}, x_{pg'})] + D[C(x_{pg}, x_{pp'}), C(x_{pg}, x_{gp'})]\|_{+} + \mu g\|\delta - D[C(x_{pg}, x_{pp'}), C(x_{pg}, x_{pg'})] + D[C(x_{pg}, x_{pp'}), C(x_{pg}, x_{gp'})]\|_{+}\}.$$

In the second combination manner, p, g, p', and g' are from a same object, and "p, p'', and g''''" or "g, p'', and g''''" correspond to different objects. Therefore, any two gait energy diagrams may be selected from p, g, p', and g' for combination, to obtain a pair of gait energy diagrams whose label distribution is "1, 0"; and similarly, any two gait energy diagrams may be selected from "p, p'', and g''''" or "g, p'', and g''''" for combination, to obtain a pair of gait energy diagrams whose label distribution is "0, 1". According to a same-label-distribution relationship or a different-label-distribution relationship between pairs of gait energy diagrams, the pairs of gait energy diagrams are filled into different positions of the C function, and another second fused gait feature vector loss function may be obtained.

The fused gait feature vector loss function may classify each set of gait energy diagrams; on the other hand, according to features of every two sets of gait energy diagrams, fused gait feature vector loss function may make feature vectors as close as possible if two sets of gait energy diagrams are from a same category, and may make feature vectors as far away as possible if the two sets of gait energy diagrams are from different category.

S905: Perform weighted summation on the fused loss value and the identity loss value, to obtain a final loss value of the training sample.

S905 is similar to the foregoing S604, and details are not described herein again.

S906: Adjust the filter parameters of the deep neural network according to a final loss value of at least one training sample.

S906 is similar to the foregoing S605, and details are not described herein again.

S902 to S905 may be performed by the foregoing training unit 13 or the processor 1.

In FIG. 8, F1 to F3 represent pairs of gait energy diagrams, D(*) in D(C(F1), C(F2)) represents a distance, C represents a probability calculation function, ID(=) represents a probability of being from a same object, and ID(≠) represents a probability of being from different objects.

In an example embodiment, after the training subsamples are inputted, gait feature vectors of gait energy diagrams may be extracted by using the deep neural network, and then are fused. Subsequently, the to-be-trained deep neural network is adjusted by using a loss function: On the one hand, each set of gait energy diagrams is classified; on the other hand, according to features of every two sets of gait energy diagrams, feature vectors are made as close as possible if two sets of gait energy diagrams are from a same category, and feature vectors are made as far away from each other as possible if two sets of gait energy diagrams are from different categories. After training of the network is completed, the trained deep neural network may be used for recognizing gaits.

The example embodiments of the disclosure further provide a video processing device. The video processing device includes at least a processor and a memory, the processor performing the foregoing video processing method by executing a program stored in the memory and invoking another device.

The example embodiments of the disclosure further provide a storage medium. The storage medium stores a plurality of instructions, the instructions being configured to be loaded by a processor to perform operations in the video processing method provided in any embodiment of the disclosure.

The gait is one of the postures. Therefore, the example embodiments of the disclosure further provide an image processing method, an image processing apparatus, an image processing device, and a storage medium, to implement posture recognition.

The image processing method includes:

obtaining a first posture energy diagram (or a first posture diagram) of an object with a to-be-recognized identity, and obtaining a second posture energy diagram (or a second posture diagram) of an object with a known identity;

inputting the first posture energy diagram and the second posture energy diagram into a deep neural network, to perform first posture recognition, the first posture recognition including:

extracting identity information corresponding to the first posture energy diagram and the second posture energy diagram, and determining a fused posture feature vector from posture features of the first posture energy diagram and the second posture energy diagram, the identity information of the first posture energy diagram including posture features of the first posture energy diagram, and the identity information of the second posture energy diagram including posture features of the second posture energy diagram; and calculating a similarity between the first posture energy diagram and the second posture energy diagram according to at least the fused posture feature vector.

The identity information and the fused posture feature vector in an example embodiment are similar to the foregoing identity information and the foregoing fused gait feature vector, and details are not described herein again.

The object with a to-be-recognized identity may be a human, or may be an animal, or even a moving or stationary object that does not have life.

The image processing apparatus may be applied in the image processing device in a software or hardware form. Specifically, the image processing device may be a server or PC providing a gait recognition service, or may be a terminal such as a digital camera, a mobile terminal (for example, a smartphone), and an iPad.

When being applied in the image processing device in a software form, the image processing apparatus may be independent software. The video processing apparatus may also be used as a subsystem (child component) of a large-scale system (such an operating system), and provides a gait recognition service.

When being applied in the image processing device in a hardware form, the image processing apparatus may be, for example, a controller/processor of a terminal or a server.

Figure 10:
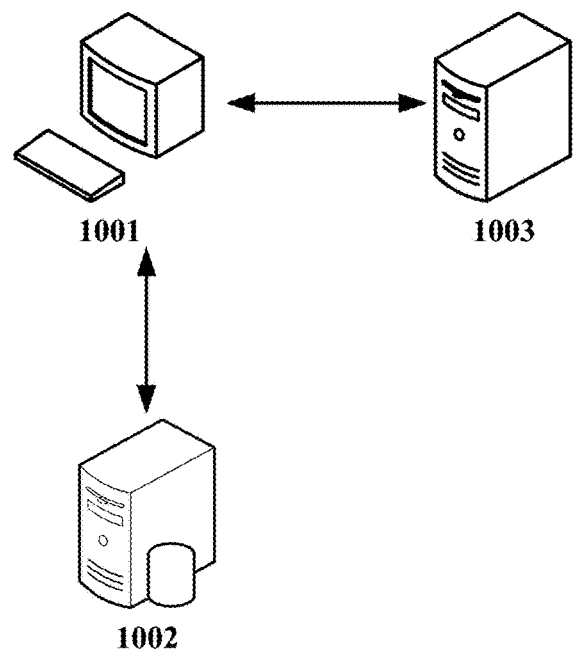
FIG. 10 is an example structural diagram of an image processing application scenario according to an example embodiment.

FIG. 10 is an example structural diagram of an image processing application scenario according to an example embodiment. An image processing device 1001 obtains a first posture energy diagram of an object with a to-be-recognized identity, and performs first posture recognition based on second posture energy diagrams of each of an object with a known identity in a database 1002.

In addition, if the deep neural network needs to be trained, a training device 1003 may be further included in the foregoing scenarios. Functions of the training device 1003 may alternatively be implemented by the image processing device 1001. The training device 1003 may be configured to train the deep neural network, or provides samples used for training.

Figure 11A:
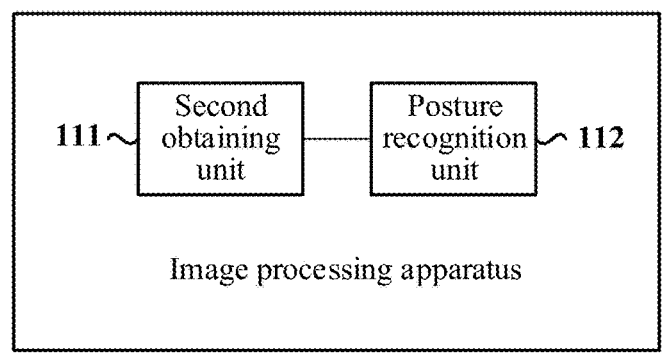
FIG. 11a and FIG. 11b are example structural diagrams of an image processing apparatus according to an example embodiment.

An example structure of the image processing apparatus is shown in FIG. 11, and includes: a second obtaining unit 111 and a posture recognition unit 112.

The second obtaining unit 111 is configured to:

obtain a first posture energy diagram of the object with a to-be-recognized identity, and obtain a second posture energy diagram of the object with a known identity.

The posture recognition unit 112 includes a deep neural network. The deep neural network may be configured to perform first posture recognition on the first posture energy diagram and the second posture energy diagram provided by the second obtaining unit 111.

For the first posture recognition, reference may be made to the foregoing description, and details are not described herein again.

Figure 11B:
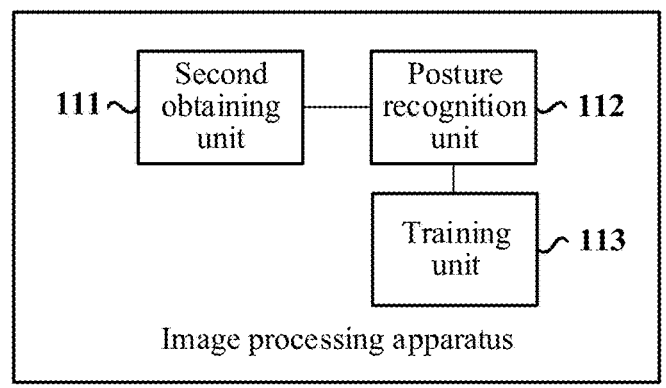

In another embodiment of the disclosure, referring to FIG. 11*b*, the image processing apparatus may further include: a training unit 113, configured to perform a training process.

The training process may relate to second posture recognition. The second posture recognition is similar to the first posture recognition, and details are not described herein again.

In addition, the training process in an example embodiment is similar to the training process of the foregoing embodiments; a training objective in an example embodiment is similar to the training objective of the foregoing embodiments; and formulas are also similar. Details are not described herein again.

For another possible schematic structural diagram of the image processing device, reference may be made to FIG. 2*c*, and details are not described herein again.

The example embodiments of the disclosure further provide an image processing device. The image processing device includes at least a processor and a memory, the processor performing the foregoing image processing method by executing a program stored in the memory and invoking another device.

The example embodiments of the disclosure further provide a storage medium. The storage medium stores a plurality of instructions, the instructions being configured to be loaded by a processor to perform operations in the image processing method provided in the example embodiments of the disclosure.

The example embodiments in this specification are all described in a progressive manner. Description of each of the example embodiments focuses on differences from other embodiments, and reference may be made to each other for the same or similar parts among respective embodiments. The apparatus disclosed in the example embodiments are corresponding to the method disclosed in the example embodiments and therefore is only briefly described, and reference may be made to the descriptions of the method for the associated part.

A person skilled in the art may further realize that the units and algorithm operations of the examples described with reference to the example embodiments disclosed in this specification may be implemented by electronic hardware, computer software, or a combination thereof. To clearly describe the interchangeability of the hardware and software, the parts and operations of each example are described generally according to the functions in the foregoing description. Whether the functions are executed in the manner of hardware or software depends on specific applications and design constraints of the technical solutions. A person skilled in the art may use different methods to implement the described functions for each specific application, but this implementation shall not be considered as going beyond the scope of the disclosure.

The operations of the method or algorithm described with reference to the disclosed embodiments in this specification may be implemented directly by using hardware, a software unit executed by a processor, or a combination thereof. The software unit may be set in a random access memory (RAM), a memory, a read-only memory (ROM), an electrically programmable ROM, an electrically erasable and programmable ROM, a register, a hard disk, a removable magnetic disk, a CD-ROM, or any storage medium in other forms well-known in the technical field.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

A person skilled in the art may implement or use the disclosure according to the foregoing descriptions of the disclosed embodiments. Various modifications made to the example embodiments are obvious to a person skilled in the art, and a general principle defined in the specification may be implemented in other embodiments without departing from the spirits or scope of the disclosure. Therefore, the disclosure is not limited to the example embodiments shown in the specification, but conforms to the widest scope consistent with the principle and novel features that are disclosed in the specification.

What is claimed is:

1. A media processing method, performed by a media processing device, the method comprising:
    obtaining a to-be-processed video, the to-be-processed video comprising an object with a to-be-recognized identity;
    generating a first gait energy diagram based on the to-be-processed video;
    obtaining a second gait energy diagram, the second gait energy diagram being generated based on a video comprising an object with a known identity;
    by using a deep neural network, extracting identity information of the first gait energy diagram and identity information of the second gait energy diagram, and determining a fused gait feature vector based on gait feature vectors of the first gait energy diagram, included in the identity information of the first gait energy diagram, and gait feature vectors of the second gait energy diagram, included in the identity information of the second gait energy diagram;
    calculating a first similarity between the first gait energy diagram and the second gait energy diagram based on the fused gait feature vector;
    calculating a second similarity between the first gait energy diagram and the second gait energy diagram based on the identity information of the first gait energy diagram and the identity information of the second gait energy diagram; and
    calculating a third similarity between the first gait energy diagram and the second gait energy diagram based on the first similarity and the second similarity.

2. The method according to claim 1, wherein the deep neural network comprises an identity information extraction layer and a fused gait feature vector extraction layer, the identity information extraction layer comprising at least a first extraction layer and a second extraction layer, and
    wherein the extracting the identity information and the determining the fused gait feature vector comprises:
        extracting, by the first extraction layer, first-level gait feature vectors respectively corresponding to the first gait energy diagram and the second gait energy diagram;
        extracting, by the second extraction layer based on the first-level gait feature vectors respectively corresponding to the first gait energy diagram and the second gait energy diagram, second-level gait feature vectors respectively corresponding to the first gait energy diagram and the second gait energy diagram; and
        fusing, by the fused gait feature vector extraction layer, the second-level gait feature vectors respectively corresponding to the first gait energy diagram and the second gait energy diagram, to obtain a second-level fused gait feature vector, and determining the second-level fused gait feature vector as the fused gait feature vector; or
        fusing, by the fused gait feature vector extraction layer, the first-level gait feature vectors respectively corresponding to the first gait energy diagram and the second gait energy diagram, to obtain a first-level fused gait feature vector, obtaining the second-level fused gait feature vector through extraction based on the first-level fused gait feature vector, and determining the second-level fused gait feature vector as the fused gait feature vector.

3. The method according to claim 1, further comprising:
    obtaining a recognition result indicating whether the object with the to-be-recognized identity and the object with the known identity are a same object.

4. The method according to claim 1, further comprising:
performing, by the deep neural network, filter parameter adjustment during a training process based on the identity information and the fused gait feature vector, wherein the training process is performed such that gait feature vectors extracted from different gait energy diagrams of a same object are similar to each other, and gait feature vectors extracted from gait energy diagrams of different objects are distinctively different from each other.

5. The method according to claim 4, wherein each training sample used in the training process comprises n (n being a positive integer) training sub samples, any one of the n training subsamples comprising two gait energy diagrams of each of an object with a known identity, and
wherein the training process comprises:
performing second gait recognition on each of the training subsamples in the training sample by using the deep neural network, the second gait recognition comprising: extracting respective identity information of two gait energy diagrams in the training subsample and a fused gait feature vector of the two gait energy diagrams, and calculating a similarity of the two gait energy diagrams based on at least the extracted fused gait feature vector;
calculating, based on the identity information extracted in the second gait recognition, an identity loss value of a training sample by using an identity information loss function, the identity loss value being smaller representing that gait feature vectors extracted from different gait energy diagrams of a same object are more similar, and gait feature vectors extracted from gait energy diagrams of different objects are farther away from each other;
calculating a fused loss value of the training sample by using a fused gait feature vector loss function;
performing weighted summation on the fused loss value and the identity loss value, to obtain a final loss value of the training sample; and
adjusting filter parameters of the deep neural network based on a final loss value of at least one training sample.

6. The method according to claim 5, wherein the training sample comprises a first training subsample, a second training subsample, and a third training subsample, and
wherein each of combination manners of the first training subsample, the second training subsample, and the third training subsample comprising a first combination manner or a second combination manner:
in the first combination manner, two gait energy diagrams in the first training subsample corresponding to a same object; two gait energy diagrams in the second training subsample corresponding to different objects; and two gait energy diagrams in the third training subsample corresponding to different objects; and
in the second combination manner, two gait energy diagrams in the first training subsample corresponding to a same object; two gait energy diagrams in the second training subsample corresponding to the same object; and two gait energy diagrams in the third training subsample corresponding to different objects.

7. The method according to claim 6, wherein, with respect to the first training subsample, the second training subsample, and the third training subsample that are combined in the first combination manner, the identity information loss function is represented by the following equation:

$$Lu = \max([1+\|U(Xp)-U(Xg)\|_2^2 - \|U(Xp')-U(Xg')\|_2^2], 0) + \eta\max([1+\|U(Xp)-U(Xg)\|_2^2 - \|U(Xp'')-U(Xg'')\|_2^2], 0)$$

wherein Lu represents the identity loss value, η represents a coefficient, and $\|*\|_2^2$ represents a Euclidean distance; p, g, p', g', p'', and g'' represent identifiers of gait energy diagrams, Xp and Xg represent a pair or gait energy diagrams in the first training subsample, Xp' and Xg' represent a pair of gait energy diagrams in the second training subsample, and Xp'' and Xg'' represent a pair of gait energy diagrams in the third training subsample, and in addition, Xp and Xp' correspond to a same object, and Xp and Xp'' correspond to different objects; and
U(Xp) to U(Xg'') represent gait feature vectors of all the gait energy diagrams.

8. The method according to claim 7, wherein the training comprises, using a first calculation sample and a second calculation sample each comprising two pairs of gait energy diagrams:
based on the two pairs of gait energy diagrams in the first calculation sample having a same true label distribution, and the two pairs of gait energy diagrams in the second calculation sample having different true label distributions, rendering a first probability corresponding to the first calculation sample to be distinctively different from a second probability corresponding to the second calculation sample; otherwise, rendering the first probability close to the second probability, and
wherein the first probability is a predicted probability that the two pairs of gait energy diagrams in the first calculation sample have a same label distribution, and the second probability is a predicted probability that the two pairs of gait energy diagrams in the second calculation sample have a same label distribution.

9. The method according to claim 8, wherein, with respect to the first training subsample, the second training subsample, and the third training subsample that are combined in the first combination manner, the fused gait feature vector loss function is represented by the following equation:

$$Lc = -[(P(x_{pg})\log Q(x_{pg}) + P(x_{p'g'})\log Q(x_{p'g'})) + \mu g(x_{pg}) \log Q(x_{pg}) + P(x_{p''g''})\log Q(x_{p''g''})] + \eta_c g\{\|\delta - D[C(x_{pg}, x_{pp'}), C(x_{pg}, x_{pg'})] + D[C(x_{pg}, x_{gp'})]\|_+ + \mu g\|\delta - D[C(x_{pg}, x_{pp'}), C(x_{pg}, x_{pg'})] + D[C(x_{pg}, x_{pp'}), C(x_{pg}, x_{gp'})]\|_+\}$$

wherein Lc represents the fused loss value, μ and $\eta_c$ represent weight coefficients, and δ represents a relaxation factor; $x_{pg}$ to $x_{gp'}$ represent all the pairs of gait energy diagrams; P(*) represents a true label distribution corresponding to one pair of gait energy diagrams; Q(*) represents a prediction result of the deep neural network for the pair of gait energy diagrams; P(*)log Q(*) represents calculating a cross entropy between the true label distribution and the prediction result; ||*|| represents comparing a value with 0, and selecting the greater one of the value and 0; C(*) is a probability calculation function, used for calculating a predicted probability that the two pairs of gait energy diagrams in the first calculation sample or the second calculation sample have a same label distribution; and a D[*] function is used for calculating a Euclidean distance between the first calculation sample and the second calculation sample.

10. The method according to claim 8, wherein, with respect to the first training subsample, the second training subsample, and the third training subsample that are combined in the second combination manner, the fused gait feature vector loss function is represented by the following equation:

$$Lc=-[(P(x_{pg})\log Q(x_{pg})+P(x_{p'g'})\log Q(x_{p'g'}))+\mu g(x_{pg})\log Q(x_{pg})+P(x_{p''g''})\log Q(x_{p''g''}))+\eta_c g\{\|\delta-D[C(x_{pg},x_{pp'}),C(x_{pg},x_{pg'})]+D[C(x_{pg},x_{pp'}),C(x_{pg},x_{gp'})]\|_+ + \mu g\|\delta-D[C(x_{pg},x_{pp'}),C(x_{pg},x_{pg'})]+D[C(x_{pg},x_{pp'}),C(x_{pg},x_{gp'})]\|_+\}$$

wherein Lc represents the fused loss value, p and represent weight coefficients, and δ represents a relaxation factor; $x_{pg}$ to $x_{gp}$ represent all the pairs of gait energy diagrams; P(*) represents a true label distribution corresponding to one pair of gait energy diagrams; Q(*) represents a prediction result of the deep neural network for the pair of gait energy diagrams;

P(*)log Q(*) represents calculating a cross entropy between the true label distribution and the prediction result; ‖*‖ represents comparing a value with 0, and selecting the greater one of the value and 0; C(*) is a probability calculation function, used for calculating a predicted probability that the two pairs of gait energy diagrams in the first calculation sample or the second calculation sample have a same label distribution; and a D[*] function is used for calculating a Euclidean distance between the first calculation sample and the second calculation sample.

11. The method according to claim 6, wherein, with respect to the first training subsample, the second training subsample, and the third training subsample that are combined in the second combination manner, the identity information loss function is represented by the following equation:

$$Lu=\max([1+\|U(Xp)-U(Xg)\|_2^2-\|U(Xp'')-U(Xg'')\|_2^2],0)+\eta\max([1+\|U(Xp')-U(Xg')\|_2^2-\|U(Xp'')-U(Xg'')\|_2^2],0)$$

wherein Lu represents the identity loss value, η represents a coefficient, and $\|*\|_2^2$ represents a Euclidean distance;

p, g, p', g', p", and g" represent identifiers of gait energy diagrams, Xp and Xg represent a pair or gait energy diagrams in the first training subsample, Xp' and Xg' represent a pair of gait energy diagrams in the second training subsample, and Xp" and Xg" represent a pair of gait energy diagrams in the third training subsample, and in addition, Xp and Xp' correspond to a same object, and Xp and Xp" correspond to different objects; and U(Xp) to U(Xg") represent gait feature vectors of all the gait energy diagrams.

12. The method according to claim 1, further comprising:
obtaining a first posture energy diagram of the object with the to-be-recognized identity;
obtaining a second posture energy diagram of the object with the known identity;
by using the deep neural network, extracting identity information of the first posture energy diagram and identity information of the second posture energy diagram, and determining a fused posture feature vector based on posture features of the first posture energy diagram, included in the identify information of the first posture energy diagram, and posture features of the second posture energy diagram, included in the identity information of the second posture energy diagram; and
calculating a similarity between the first posture energy diagram and the second posture energy diagram based on at least the fused posture feature vector.

13. A media processing device, comprising:
at least one memory configured to store program code; and
at least one processor configured to read the program code and operate as instructed by the program code, the program code comprising:
first obtaining code configured to cause at least one of the at least one processor to obtain a to-be-processed video, the to-be-processed video comprising an object with a to-be-recognized identity;
generating code configured to cause at least one of the at least one processor to generate a first gait energy diagram based on the to-be-processed video;
second obtaining code configured to cause at least one of the at least one processor to obtain a second gait energy diagram, the second gait energy diagram being generated based on a video comprising an object with a known identity;
extracting code configured to cause at least one of the at least one processor to, by using a deep neural network, identity information of the first gait energy diagram and identity information of the second gait energy diagram, and determine a fused gait feature vector based on gait feature vectors of the first gait energy diagram, included in the identity information of the first gait energy diagram, and gait feature vectors of the second gait energy diagram, included in the identity information of the second gait energy diagram;
first similarity calculating code configured to cause at least one of the at least one processor to calculate a first similarity between the first gait energy diagram and the second gait energy diagram based on the fused gait feature vector;
second similarity calculating code configured to cause at least one of the at least one processor to calculate a second similarity between the first gait energy diagram and the second gait energy diagram based on the identity information of the first gait energy diagram and the identity information of the second gait energy diagram; and
third similarity calculating code configured to cause at least one of the at least one processor to calculate the third similarity between the first gait energy diagram and the second gait energy diagram based on the first similarity and the second similarity.

14. The device according to claim 13, wherein the deep neural network comprises an identity information extraction layer and a fused gait feature vector extraction layer, the identity information extraction layer comprising at least a first extraction layer and a second extraction layer, and
wherein the extracting code comprises:
code configured to cause at least one of the at least one processor to, by using the first extraction layer, extract first-level gait feature vectors respectively corresponding to the first gait energy diagram and the second gait energy diagram;
code configured to cause at least one of the at least one processor to, by using the second extraction layer based on the first-level gait feature vectors respectively corresponding to the first gait energy diagram and the second gait energy diagram, extract second-level gait feature vectors respectively corresponding to the first gait energy diagram and the second gait energy diagram; and
code configured to cause at least one of the at least one processor to, by using the fused gait feature vector extraction layer, fuse the second-level gait feature vectors respectively corresponding to the first gait energy diagram and the second gait energy diagram, to obtain a second-level fused gait feature vector, and determining the second-level fused gait feature vector as the fused gait feature vector; or code configured to cause at least one of the at least one processor to, by using the fused gait feature vector extraction layer, fuse the first-level gait feature vectors respectively corresponding to the first gait energy diagram and the second gait energy diagram, to obtain a first-level fused gait feature vector, obtaining a second-level fused gait feature vector through extraction based on the first-level fused gait feature vector, and determine the second-level fused gait feature vector as the fused gait feature vector.

15. The device according to claim 13, wherein the program code further comprises:

code configured to cause at least one of the at least one processor to obtain a recognition result indicating whether the object with the to-be-recognized identity and the object with the known identity are a same object.

16. The device according to claim 13, wherein the program code further comprises:

code configured to cause at least one of the at least one processor to, by the deep neural network, perform filter parameter adjustment during a training process based on the identity information and the fused gait feature vector, wherein the training process is performed such that gait feature vectors extracted from different gait energy diagrams of a same object are similar to each other, and gait feature vectors extracted from gait energy diagrams of different objects are distinctively different from each other.

17. The device according to claim 13, wherein the program code further comprises:

code configured to cause at least one of the at least one processor to obtain a first posture energy diagram of the object with the to-be-recognized identity;

code configured to cause at least one of the at least one processor to obtain a second posture energy diagram of the object with the known identity;

code configured to cause at least one of the at least one processor to, by using the deep neural network, extract identity information the first posture energy diagram and identity information of the second posture energy diagram, and determine a fused posture feature vector based on posture features of the first posture energy diagram, included in the identify information of the first posture energy diagram, and posture features of the second posture energy diagram, included in the identify information of the second posture energy diagram; and calculating a similarity between the first posture energy diagram and the second posture energy diagram based on at least the fused posture feature vector.

18. A non-transitory computer-readable storage medium, storing a plurality of instructions executable by at least one processor to perform media processing method, the method comprising:

obtaining a to-be-processed video, the to-be-processed video comprising an object with a to-be-recognized identity;

generating a first gait energy diagram based on the to-be-processed video;

obtaining a second gait energy diagram, the second gait energy diagram being generated based on a video comprising an object with a known identity;

by using a deep neural network, extracting identity information of the first gait energy diagram and the second gait energy diagram, and determining a fused gait feature vector based on gait feature vectors of the first gait energy diagram, included in the identity information of the first gait energy diagram, and gait feature vectors of the second gait energy diagram, included in the identity information of the second gait energy diagram;

calculating a similarity between the first gait energy diagram and the second gait energy diagram based on at least the fused gait feature vector;

calculating a first similarity between the first gait energy diagram and the second gait energy diagram based on the fused gait feature vector;

calculating a second similarity between the first gait energy diagram and the second gait energy diagram based on the identity information of the first gait energy diagram and the identity information of the second gait energy diagram; and calculating a third similarity between the first gait energy diagram and the second gait energy diagram based on the first similarity and the second similarity.

* * * * *